United States Patent [19]
Hotta et al.

[11] Patent Number: 5,581,633
[45] Date of Patent: Dec. 3, 1996

[54] METHOD AND APPARATUS FOR SEGMENTING A CHARACTER AND FOR EXTRACTING A CHARACTER STRING BASED ON A HISTOGRAM

[75] Inventors: Yoshinobu Hotta; Satoshi Naoi, both of Kawasaki, Japan

[73] Assignee: Fujitsu Limited, Kanagawa, Japan

[21] Appl. No.: 548,414

[22] Filed: Oct. 26, 1995

Related U.S. Application Data

[63] Continuation of Ser. No. 233,976, Apr. 28, 1994, abandoned.

[30] Foreign Application Priority Data

Jun. 11, 1993 [JP] Japan ..................................... 5-140428

[51] Int. Cl.$^6$ ..................................................... G06K 9/36
[52] U.S. Cl. ............................ 382/171; 382/174; 382/177
[58] Field of Search ..................................... 382/171, 174, 382/177, 178, 179, 292, 202, 206

[56] References Cited

U.S. PATENT DOCUMENTS

| | | | |
|---|---|---|---|
| 4,481,665 | 11/1984 | Ota | 382/48 |
| 4,594,732 | 6/1986 | Tsuji | 382/9 |
| 4,998,285 | 3/1991 | Suzuki et al. | 382/9 |
| 5,046,114 | 9/1991 | Zobel | 382/9 |
| 5,062,141 | 10/1991 | Nakayama et al. | 382/9 |
| 5,138,668 | 8/1992 | Abe | 382/9 |
| 5,216,725 | 6/1993 | McCubbrey | 382/9 |
| 5,228,095 | 7/1993 | Abe | 382/9 |
| 5,369,715 | 11/1994 | Tanaka et al. | 382/18 |
| 5,410,611 | 4/1995 | Huttenlocher et al. | 382/9 |

FOREIGN PATENT DOCUMENTS

| | | | |
|---|---|---|---|
| 1-51592 | 2/1989 | Japan | 382/9 |
| 4-142685 | 5/1992 | Japan | 382/24 |

*Primary Examiner*—Leo Boudreau
*Assistant Examiner*—Andrew W. Johns
*Attorney, Agent, or Firm*—Staas and Halsey

[57] ABSTRACT

In a character segmenting apparatus the extracting section extracts the character segment pattern on the basis of the connection data imparted to the segment pattern. The character size calculating section calculates a histogram of a lengthwise or crosswise character size of a circumscribed rectangle circumscribed with the extracted character segment pattern and also calculates an average character size and its variance value on the basis of the histogram of the character size. The character pitch calculating section calculates a histogram of a pitch between the circumscribed rectangles and also calculates an average character pitch and its variance value on the basis of the histogram of the character pitch. The integrating section integrates the character while changing character integrating conditions in accordance with the average character size, the size variance value, the average character pitch and the pitch variance value. The segment integrating section integrates the character by distinguishing the small segment patterns in the character segment pattern on the basis of the average character size.

33 Claims, 25 Drawing Sheets

FIG.5

LABELING NUMBER  1    2    3 4    5 6  7 8

LABELING NUMBER    1    2    3    4    5    6    7    8

3  4  2  4  1  7  5  -

FIG.13A   FIG.13B
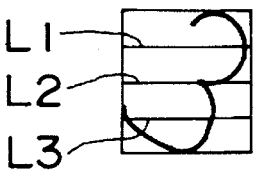 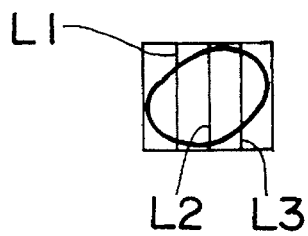
FIG.14
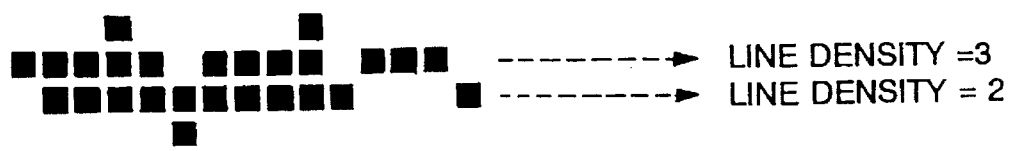
FIG.15A   FIG.15C
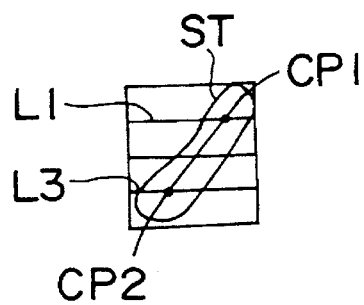 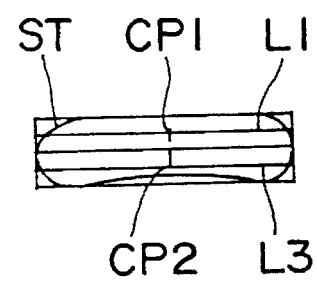
FIG.15B
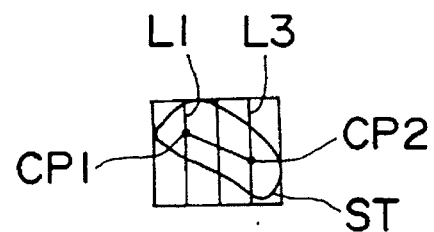

FIG.18A  FIG.18B  FIG.18D
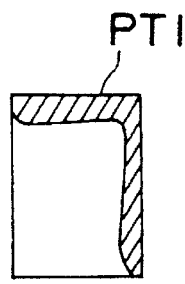  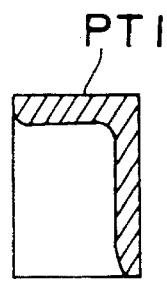  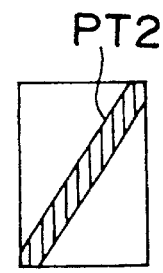
FIG.18C  FIG.18E
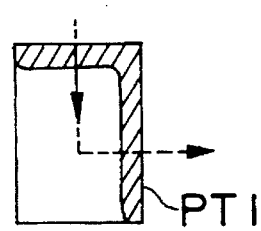  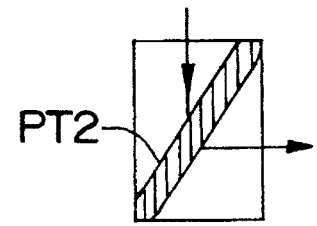
FIG.18F  FIG.18G  FIG.18H
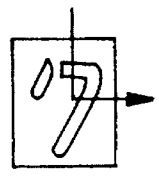  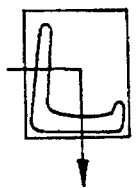  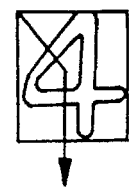

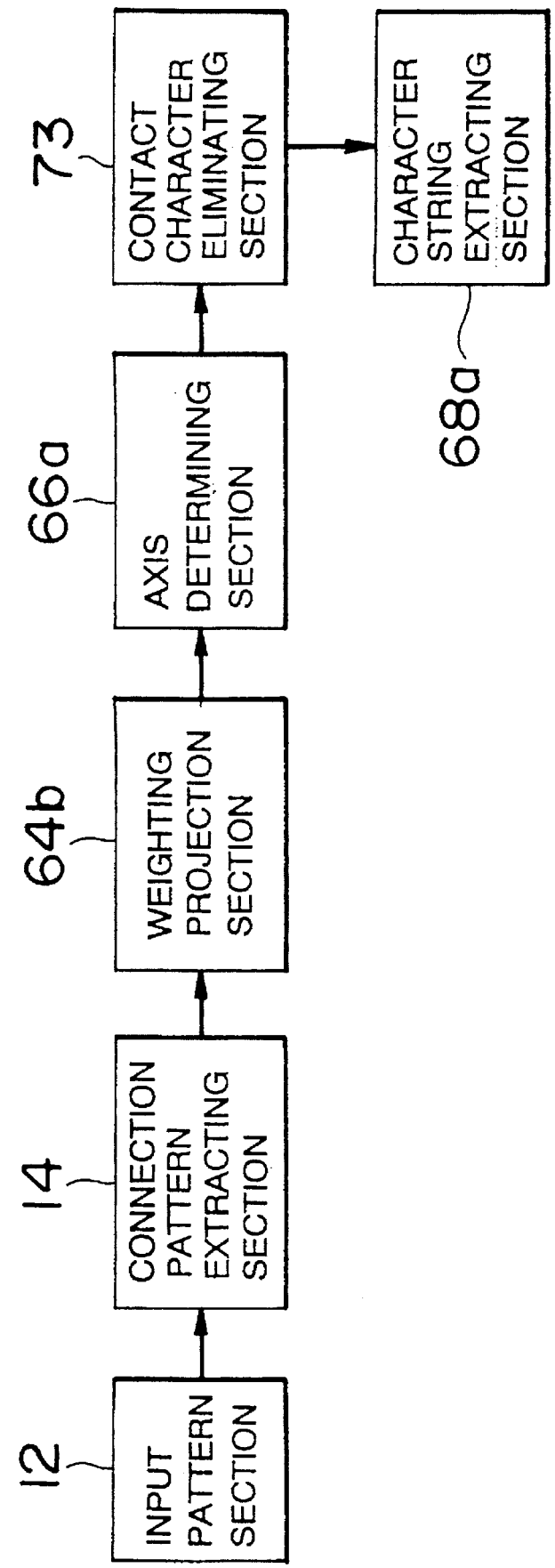

& nbsp;
METHOD AND APPARATUS FOR SEGMENTING A CHARACTER AND FOR EXTRACTING A CHARACTER STRING BASED ON A HISTOGRAM This application is a continuation of application Ser. No 08/233,976, filed Apr. 28, 1994, now abandoned.

BACKGROUND OF THE INVENTION

The present invention relates to an apparatus for and a method of performing a character segmentation of each character of a character string. This invention also relates to an apparatus for and a method of extracting a character string.

In recent years, demand has been increasing for a handwritten character recognizing apparatus. The handwritten character recognizing apparatus recognizes a character by segmenting each character of a character string composed of a plurality of characters. In this case, a process important for precisely recognizing each character involves a segmentation of each character.

According to the prior art, a writer who writes characters writes a character finely in a character frame of a document in which character writing positions are designated beforehand. When segmenting the written character, the above character recognizing apparatus calculates, as a character size for recognizing the character, a simple average of a maximum character rectangle in the character string or of a character rectangle in the character string. The related art character recognizing apparatus segments the character by calculating a pitch between the characters, then integrates the character.

For example, Japanese Patent Laid-Open No. 4-098477 discloses a known technology of calculating the interchar- acter pitch. According to this known technology, a one-dimensional projection is effected on a character pattern. The character pitch is calculated by an interval between a white pixel and a black pixel that is thus obtained. Further, Japanese Patent Laid-Open No. 60-173685 discloses a technology in which the character pitch is estimated by performing a one-dimensional Fourier transform on image data of a document. Japanese Patent Laid-Open No. 62-195893 discloses a technology wherein a character segmenting position is searched within an estimated range by defining the estimated range in which the character is to be segmented based on data about a height of the character string.

On the other hand, Japanese Patent Laid-Open No. 4-017086 discloses a known technology of integrating the character. According to this known technology, rectangles bordering the extremities of segment patterns (hereinafter, referred to as the rectangles) are integrated based on a character size and a character pitch by extracting the circumscribed rectangles of the black pixels that are to be connected.

As described above, the respective characters written in the character frames arranged at equal intervals are segmented by the character segmenting method; it is therefore possible to recognize the character with considerable accuracy.

In addition, it is troublesome for the writer writing the characters to finely write each character in the character frame. Therefore, the writer writes the characters at a free pitch on the sheet with no character frame. The characters written at the free pitch are formed comparatively large and small, overlapped with each other and contacted with each other. In addition, an overhang is produced in which the characters are contiguous to each other. Further, a separation stroke is produced in which one numeral is separated into a plurality of patterns.

When using the conventional character segmenting method for the character string in which the characters are written at the free pitch, however, the following problems arise. First, the maximum rectangle in the character string is employed as a fiducial character size with respect to the character string in which a character size fluctuates. In this case, if even one character that is extremely large exists, this large character turns out to be the fiducial character size. This large character size is not proper as a size when integrating the character.

Further, if an average character size is simply calculated with respect to the character string having a multiplicity of small segment patterns of points or the like, the average character size undergoes an influence of the small size rectangles of the points or the like. For this reason, it follows that the average character size is calculated smaller than an actual size.

Moreover, in the case of calculating the pitch by the one-dimensional projection with respect to the character string having the overhang, a boundary between the white pixel and the black pixel does not appear. Consequently, a problem of causing a decrease in a character recognizing factor exists.

Further, according to the method of defining the estimated range in which the character should be segmented based on the height data of the character string, a handwritten Chinese character and a printed character exhibiting a high squareness present no problem. In the character string in which the character size of a handwritten numeral fluctuates largely, however, there is such a problem that the estimated range for the character segmentation is not clearly defined.

On the other hand, the following are conventional methods of extracting a character string. To start with, according to a first extracting method, a histogram is obtained by effecting a projection on the character in a horizonal or vertical direction, wherein the character on the document image is shown by the black pixels, while the background is shown by the white pixels. Then, in this method, the character string is extracted from a crest and a trough of the histogram.

According to a second extracting method, enlarging and contracting processes are executed a plurality of times on the black pixels, and a group of pixels obtained are employed as one character string. The second method is stated in a Treatise Journal 83/4 Vol.J66-D No.437–444, compiled by the Electronic Communications Association. According to a third extracting method, a circumscribed rectangle of a connection pattern is obtained, and a projection is applied to center coordinates thereof, wherein a weight is on an area of the rectangle. Then, this method is classified as a method of taking a peripheral distribution of obtained projection values. This method is stated in the Treatise Journal 85/12 Vol. J68-D No.12 2123–2131, compiled by the Electronic Communications Association.

If an up-and-down or right-and-left interval of the handwritten character strings is small, it may easily happen that a part of the character of a certain character string enters between the characters of an adjacent character string. In this case, the trough is hard to detect from the projected histogram by the above method of obtaining the histogram. Further, a shape of the histogram depends on an intricacy of the character.

Additionally, according to the method of performing the enlarging and contracting processes on the black pixels, it follows that all of the upper and lower character strings come in one group. In a method of taking a weighting projection of the rectangle center coordinates on the basis of the circumscribed rectangles of the connection pattern, weighting is effected on the only rectangular center. Hence, the character size data can not be read from a projection value. This leads to a problem in which a peripheral distribution range is hard to specify. Further, there are some characters in which the size of width fluctuates, although a height size is substantially fixed as in the case of a number. For those characters, the projection is applied to the rectangle center coordinates, wherein the weight is on a character area. For this reason, a problem of easily undergoing an influence of a laterally elongated character in the process of extracting the character string from the peripheral distribution exists.

SUMMARY OF THE INVENTION

It is a first object of the present invention to provide a character segmenting method and a character segmenting apparatus capable of accurately segmenting a character even when an overhang and a separation stroke occur.

It is a second object of the present invention to provide a character string extracting method and a character string extracting apparatus capable of easily extracting a character string even when an interval between character strings is small, and when the characters contact each other between the character strings.

In a character segmenting apparatus according to the present invention, a character string pattern is formed by arranging a plurality of character segment patterns. Each segment pattern is composed of any one of a pattern formed by one character and a small segment pattern formed by a part of one character. The character segmenting apparatus of this invention segments the character on the basis of connection data imparted to each segment pattern. The character segmenting apparatus comprises an extracting section, a character size calculating section, a character pitch calculating section, an integrating section and a segment integrating section.

The extracting section extracts the character segment pattern on the basis of the connection data. The character size calculating section calculates a histogram of a lengthwise or crosswise character size of a circumscribed rectangle circumscribed with the character segment pattern extracted by the extracting section and, at the same time, calculates an average character size and its variance value on the basis of the obtained character size histogram.

The character pitch calculating section calculates a histogram of a pitch between the circumscribed rectangles in the character size calculating section and, at the same time, calculates an average character pitch and its variance value on the basis of the obtained character pitch histogram.

The integrating section integrates the character while changing character integrating conditions in accordance with the average character size and the size variance value that have been obtained by the character size calculating section and the average character pitch and the pitch variance value that have been obtained by the character pitch calculating section.

The segment integrating section integrates the character by distinguishing the small segment patterns in the character segment pattern on the basis of the average character size obtained by the character size calculating section.

Further, in the character string extracting apparatus according to the present invention, a character string pattern is formed by arranging a plurality of character segment patterns. The character string extracting apparatus extracts a character string on the basis of connection data imparted to each segment pattern. The character string extracting apparatus comprises an extracting section, a weighting projection section, an axis determining section and a character string extracting section. The extracting section imparts the connection data to the character string and extracts a character segment pattern on the basis of the connection data. The weighting projection section obtains a projection histogram by performing a weighting projection on a lengthwise or crosswise line segment of a circumscribed rectangle circumscribed with the segment pattern extracted by the extracting section. The axis determining section determines a character string axis on the basis of the projection histogram obtained by the weighting projection section. The character string extracting section extracts a character string on the basis of the character string axis determined by the axis determining section.

Further, in a character segmenting method according to the present invention, a character string pattern is formed by arranging a plurality of character segment patterns. Each segment pattern is composed of one of a pattern formed by one character and a small segment pattern formed by a part of one character. In the character segmenting method of this invention, a character is segmented based on connection data imparted to each segment pattern.

The character segmenting method comprises an extracting step, a character size calculating step, a character pitch calculating step, an integrating step and a segment integrating step.

The extracting step involves extracting the character segment pattern on the basis of the connection data.

The character size calculating step involves calculating a histogram of a lengthwise or crosswise character size of a circumscribed rectangle circumscribed with the extracted character segment pattern and, at the same time, calculating an average character size and its variance value on the basis of the obtained character size histogram.

The character pitch calculating step involves calculating a histogram of a pitch between the circumscribed rectangles in the character size calculating step and, at the same time, calculating an average character pitch and its variance value on the basis of the obtained character pitch histogram.

The integrating step involves integrating the character while changing character integrating conditions in accordance with the average character size and the size variance value that have been obtained in the character size calculating step and the average character pitch and the pitch variance value that have been obtained in the character pitch calculating step.

The segment integrating step involves integrating the character by distinguishing the small segment patterns in the character segment pattern on the basis of the average character size obtained in the character size calculating step.

Moreover, in a character string extracting method according to this invention, a character string pattern is formed by arranging a plurality of character segment patterns. A character string is extracted based on connection data imparted to each segment pattern. The character string extracting method comprises an extracting step, a weighting projection step, an axis determining step and a character string extracting step.

The extracting step involves imparting the connection data to the character string and extracting the character segment pattern on the basis of the connection data. The weighting projection step involves obtaining a projection histogram by performing a weighting projection on a lengthwise or crosswise line segment of a circumscribed rectangle circumscribed with the extracted segment pattern. The axis determining step involves determining a character string axis on the basis of the projection histograms. The character string extracting step involves extracting a character string on the basis of the character string axis determined in the axis determining step.

According to the character segmenting apparatus, the character size calculating section calculates the average character size and its variance value. The character pitch calculating section calculates the average character pitch and its variance value. The integrating section integrates the character while changing the character integrating conditions in accordance with the average character size, the size variance value, the average character pitch and the pitch variance value. Further, the segment integrating section integrates the character by distinguishing the small segment patterns in the character segment pattern on the basis of the average character size.

That is, the average character size and pitch are strictly calculated with respect to the character string in which an indefinite pitch and a character size fluctuate. When integrating the character, the integrating conditions are adaptively varied corresponding to an average value and a variance value thereof. Hence, the character segmentation can be executed with a high accuracy. Further, the character integration is effected by paying attention to the small segment pattern, and, therefore, precise and high-speed processing can be done.

In addition, the weighting projection section obtains the projection histogram by performing the weighting projection on the lengthwise or crosswise line segment of the circumscribed rectangle circumscribed with the extracted segment pattern. The axis determining section determines the character string axis on the basis of the projection histogram. Then, the character string extracting section extracts the character string on the basis of the determined character string axis. Accordingly, even when the characters are disposed close to each other, and when some portion of a certain character belongs to other character string, the character string can be extracted at the high speed with the high accuracy.

BRIEF DESCRIPTION OF THE DRAWINGS

Other objects and advantages of the present invention will become apparent during the following discussion in conjunction with the accompanying drawings, in which:

FIG. 5 is a diagram showing a labeling process;

FIG. 6 is a diagram showing a calculation of a circumscribed rectangle coordinate value of a segment pattern;

FIG. 13A is a diagram showing a method of calculating a line density in the horizontal direction; FIG. 13B is a diagram showing a method of calculating a line density in the vertical direction;

FIG. 14 is a diagram showing a failure example of calculating the line density in the horizontal direction with respect to a laterally elongate stroke;

FIG. 15A is a diagram illustrating an inclination of the small separation stroke which is calculated in the horizontal direction with respect to a circumscribed rectangle;

FIG. 15B is a diagram showing an inclination of the small separation stroke which is calculated in the vertical direction with respect to the circumscribed rectangle;

FIG. 15C is a diagram showing an inclination of the small separation stroke which is calculated in the horizontal direction with respect to a laterally elongate circumscribed rectangle;

FIG. 18A is a diagram illustrating a right pattern in which the line density is to be calculated;

FIG. 18B is a diagram showing a unidirectionally calculated line density with respect to the right pattern shown in FIG. 18A;

FIG. 18C is a diagram showing a multi-directionally calculated line density with respect to the right pattern shown in FIG. 18A;

FIG. 18D is a diagram showing a unidirectionally calculated line density of another right pattern in which the line density is to be calculated;

FIG. 18E is a diagram showing a multi-directionally calculated line density with respect to another right pattern shown in FIG. 18D;

FIG. 18F is a diagram showing a multi-directionally calculated line density with respect to "7";

FIG. 18G is a diagram showing a multi-directionally calculated line density with respect to "L";

FIG. 18H is a diagram showing a line density calculated in multi-directions other than a right-angled direction with respect to "4";

FIG. 34 is a block diagram showing a construction of the character string extracting apparatus in accordance with a fourth embodiment;

DETAILED DESCRIPTION OF THE PREFERRED EMBODIMENTS

Figure 1:
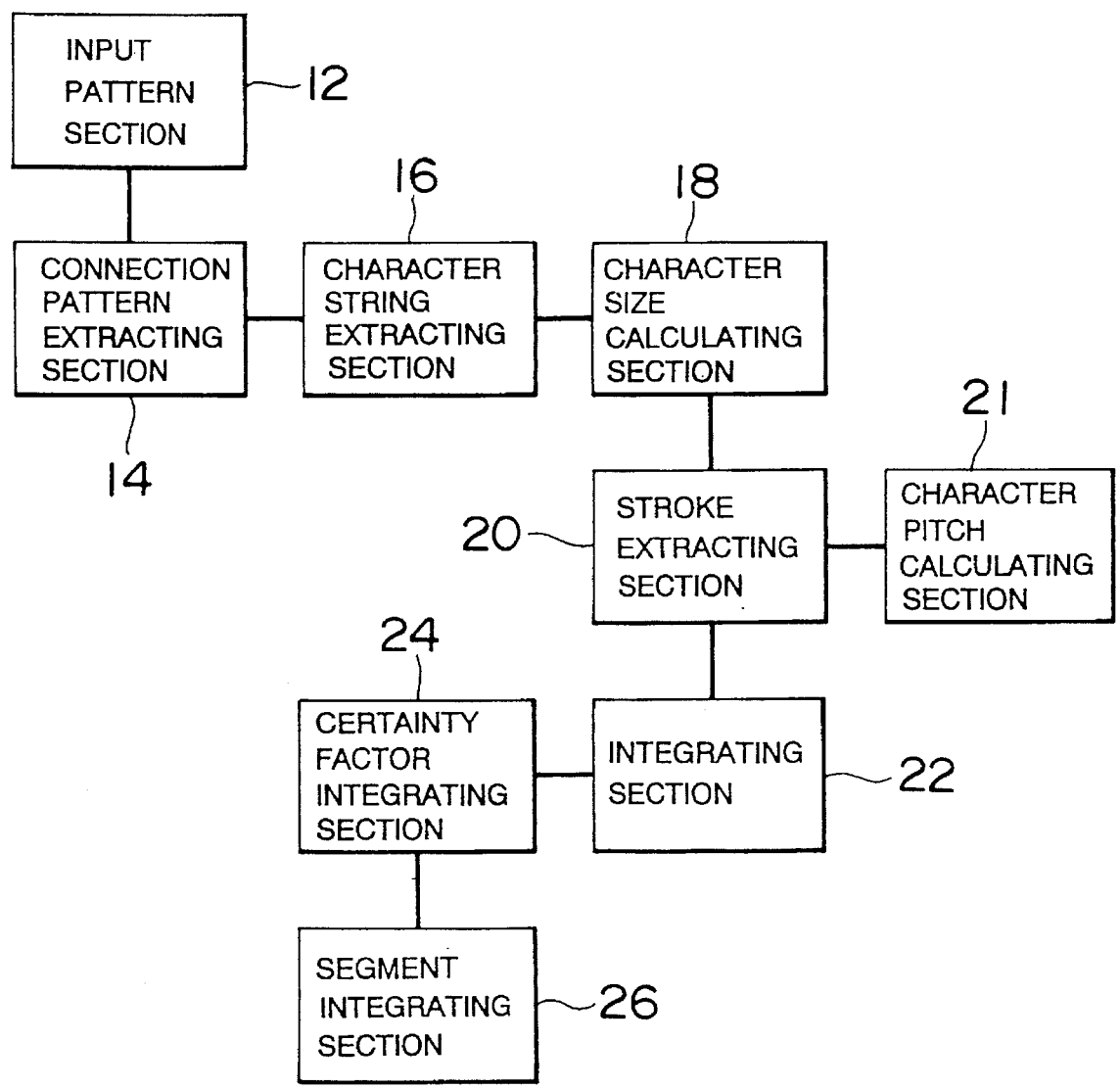
FIG. 1 is a block diagram illustrating a construction of a character segmenting apparatus in accordance with a first embodiment of the present invention.

Specific embodiments of a character segmenting method and an apparatus thereof according to this invention will hereinafter be described, FIG. 1 is a block diagram illustrating a construction of the character segmenting apparatus in accordance with a first embodiment of this invention.

The character segmenting apparatus of the present invention is applicable to a handwritten character recognizing apparatus and a printed-character recognizing apparatus. Further, the character segmenting apparatus is also applicable to a handwritten character segmenting apparatus of a character segmenting apparatus in recognition of drawings. The character segmenting apparatus in a first embodiment segments each character for recognizing each character of a character string. The character segmenting apparatus comprises an input pattern section 12, a connection pattern extracting section 14, a character string extracting section 16 and a character size calculating section 18. Further, the character segmenting apparatus comprises a stroke extracting section 20, a character pitch calculating section 21, an integrating section 22, a certainty factor integrating section 24 and a segment integrating section 26.

The input pattern section 12 has a character string pattern containing a small separation stroke and an overhang. The character string pattern is formed such that a plurality of character segment patterns are arranged. Each segment pattern is composed of one of a pattern consisting of one character and a small segment pattern consisting of a part of one character. The small separation stroke represents a small segment pattern when one character is separated into a plurality of patterns. Note that the characters herein include alphabets and numerals.

The connection pattern extracting section 14 extracts only a connection pattern by labeling the character string pattern inputted from the input pattern section 12. The character string extracting section 16 is connected to this connection pattern extracting section 14.

This character string extracting section 16 extracts a segment pattern of the labeled character string pattern. The character size calculating section 18 is connected to this character string extracting section 16. The character size calculating section 18 calculates a histogram of a lengthwise or crosswise size of a circumscribed rectangular character circumscribed with the segment pattern of the character extracted by the character string extracting section 16. The character size calculating section 18 also calculates an average character size and a variance value thereof on the basis of the obtained histogram of the character size. The stroke extracting section 20 is connected to the character size calculating section 18.

The stroke extracting section 20 obtains an area ratio or a height ratio of the circumscribed rectangular character size to the average character size by use of the above average character size. Based on a result thereof, the stroke extracting section 20 extracts a small separation stroke from within the segment pattern in the character string. Connected to the stroke extracting section 20 are the character pitch calculating section 21 and the integrating section 22.

The character pitch calculating section 21 calculates a histogram of a pitch between the circumscribed rectangles. Based on the obtained histogram of the character pitch, the character pitch calculating section 21 also calculates an average character pitch and a variance value thereof. The integrating section 22 is connected to the character pitch calculating section 21.

The integrating section 22 integrates the character while changing character integrating conditions in accordance with the average character pitch and the pitch variance value obtained by the character pitch calculating section 21 as well as with the average character size and the size variance value obtained by the character size calculating section 18. The certainty factor integrating section 24 is connected to the integrating section 22.

The certainty factor integrating section 24 calculates distances between the small separation stroke and character patters located on the right and left sides thereof. The certainty factor integrating section 24 quantifies a distance ratio therebetween as a certainty factor for integration and, if the certainty factor is high, effects the integration. The segment integrating section 26 is connected to the certainty factor integrating section 24.

The segment integrating section 26 integrates the character by distinguishing a small segment pattern in the character segment pattern on the basis of the average character size obtained by the character size calculating section 18.

Figure 2:
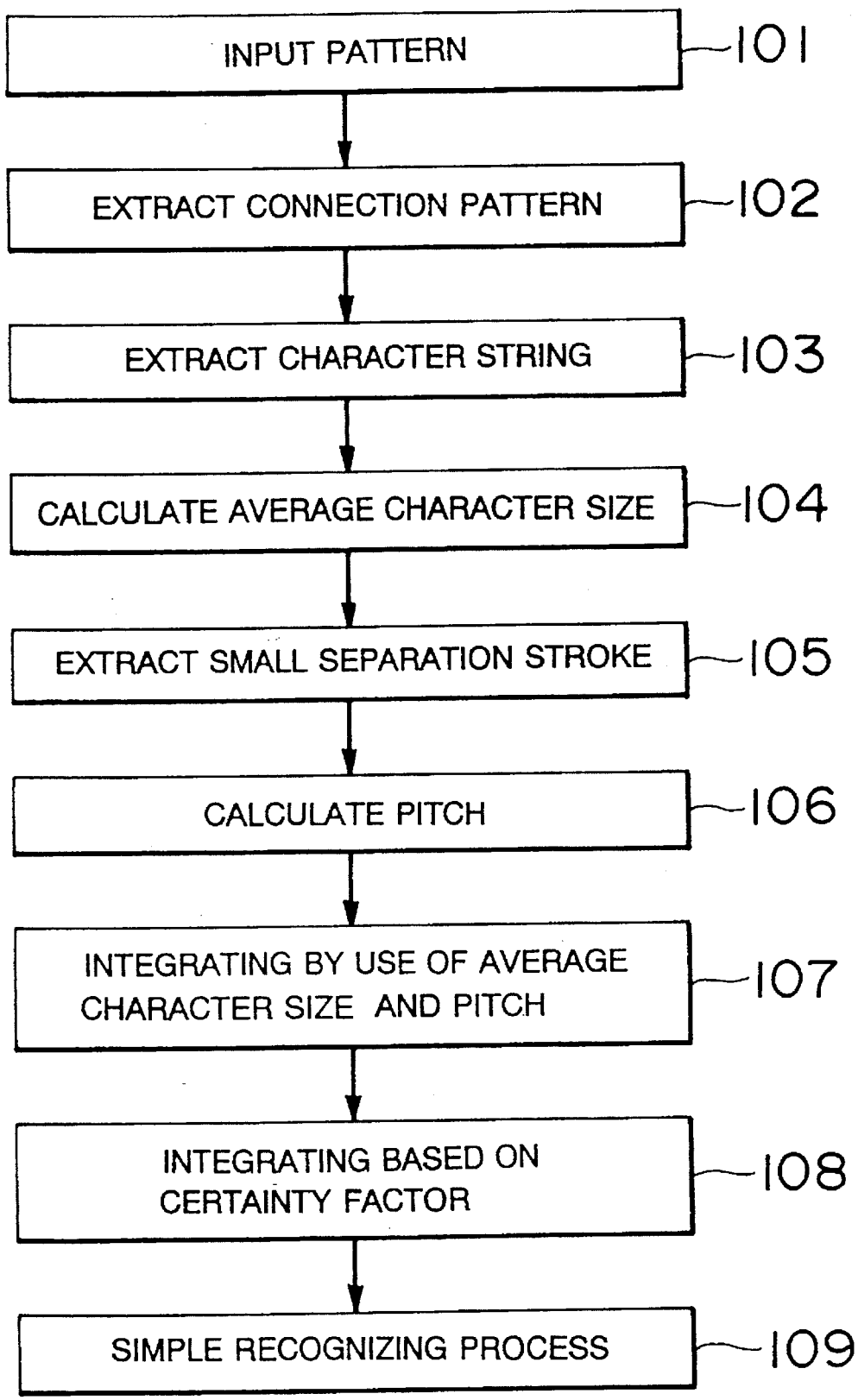
FIG. 2 is a flowchart showing a character segmenting method in accordance with the first embodiment of this invention.

Next, a character segmenting method in accordance with the first embodiment of this invention will be discussed. FIG. 2 is a flowchart showing the character segmenting method in accordance with the first embodiment of this invention. To start with, the connection pattern extracting section 14 inputs a character string pattern consisting of a plurality of arranged character segment patterns from the input pattern section 12 (step 101). The connection pattern extracting section 14 extracts a connection pattern by labeling the inputted character string pattern (step 102).

The character string extracting section 16 extracts a segment pattern of the labeled character string pattern (step 103). The character size calculating section 18 calculates a histogram of a lengthwise or crosswise size of a circumscribed rectangular character circumscribed with the extracted character segment pattern. The character size calculating section 18 calculates an average character size and a variance value thereof on the basis of the obtained histogram of the character size (step 104).

The stroke extracting section 20 obtains an area ratio or a height ratio of the circumscribed rectangular character size to the average character size by use of the above average character size. Based on a result thereof, the stroke extracting section 20 extracts a small separation stroke from within the segment pattern in the character string (step 105).

Next, the character pitch calculating section 21 calculates a histogram of an inter circumscribed rectangle pitch. Based on the obtained histogram of the character pitch, the character pitch calculating section 21 also calculates an average character pitch and a variance value thereof (step 106). The integrating section 22 integrates the character while changing character integrating conditions in accordance with the average character pitch and the pitch variance value as well as with the average character size and the size variance value (step 107).

The certainty factor integrating section 24 calculates distances between the small separation stroke and character patters located on the right and left sides thereof. The certainty factor integrating section 24 quantifies a distance ratio therebetween as a certainty factor for integration and, if the certainty factor is high, effects the integration (step 108). The segment integrating section 26 integrates the character by distinguishing a small segment pattern in the character segment pattern on the basis of the average character size (step 109).

As described above, according to the character segmenting apparatus in the first embodiment, the average character size and the average character pitch are strictly calculated with respect to the character string in which the character size fluctuate at an indefinite pitch. The integrating section 22 adaptively changes, when integrating the character, the integrating conditions in accordance with the values of the average character size and the average character pitch and the variance values thereof. The character segmentation can be therefore performed with a high accuracy.

Particularly for the handwritten character string of numerals, the pattern matching method is not employed but the simple recognizing process in which the attention is paid to the small separation stroke. Hence, the processing can be performed accurately at a high speed.

Further, the certainty factor integrating section 24 quantifies the distance ratio, as a certainty factor, between the separation stroke and the patterns located on the right and left hands thereof. The certainty factor integrating section 24 integrates the character in accordance with a value thereof and is therefore capable of effecting the precise integration.

Figure 3:
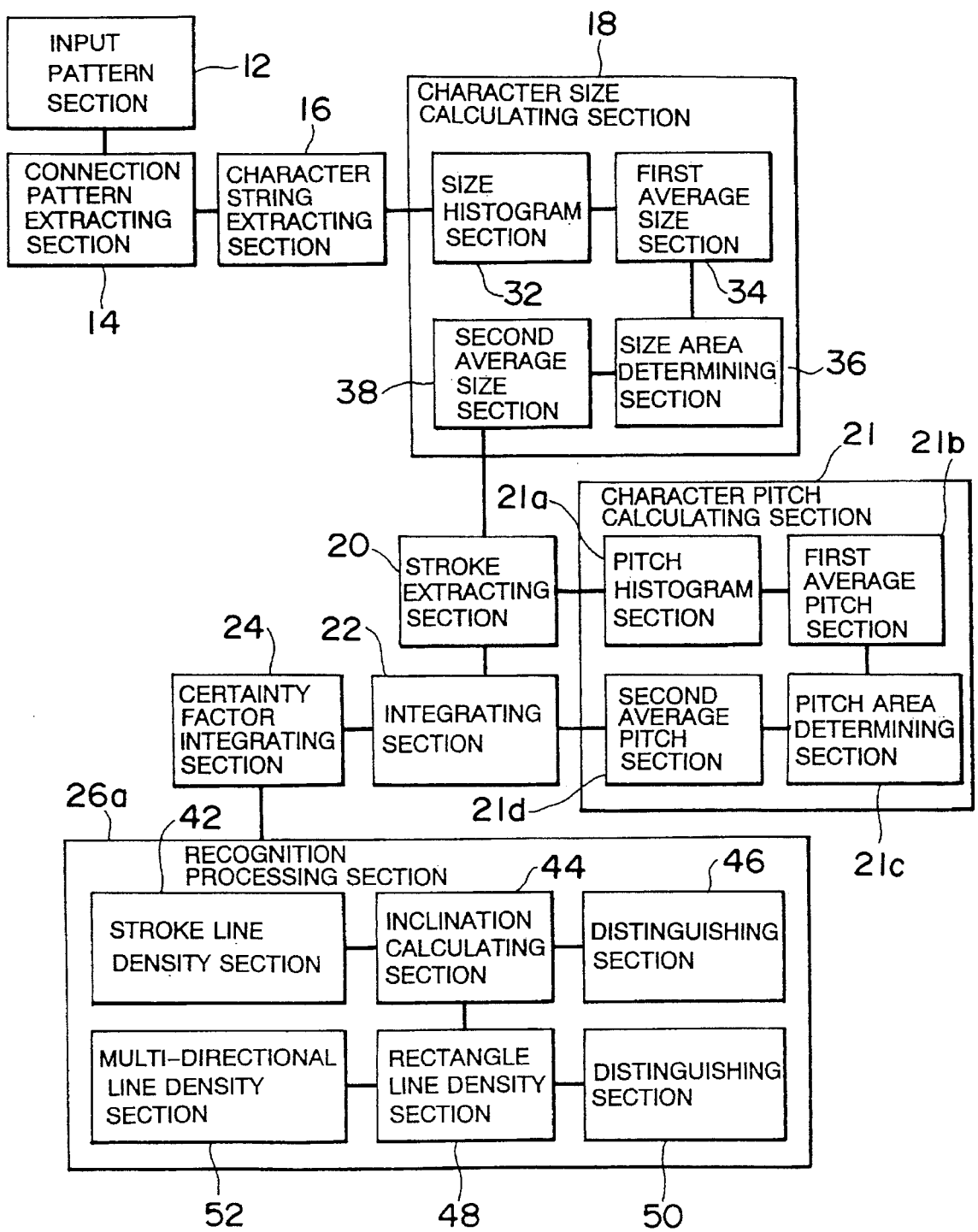
FIG. 3 is a block diagram illustrating a construction of the character segmenting apparatus in accordance with a second embodiment of this invention.

Given next is an explanation of the character segmenting apparatus and method in accordance with a second embodiment of the present invention. FIG. 3 is a block diagram illustrating a configuration of the character segmenting apparatus in accordance with the second embodiment of this invention. The character segmenting apparatus in the second embodiment segments characters one by one from a handwritten character string having overhangs. This apparatus segments the characters one by one from the handwritten character string in which the character size fluctuates at an indefinite pitch.

Referring to FIG. 3, the input pattern section 12 has the character string pattern containing the small separation stroke and the overhang. The character string pattern is formed such that the plurality of character segment patterns are arranged. Each segment pattern is composed of one of the pattern consisting of one character and a small segment pattern consisting of a part of one character. The small separation stroke represents the small segment pattern when one character is separated into the plurality of patterns. Note that the characters herein include alphabets and numerals.

The connection pattern extracting section 14 extracts only the connection pattern by labeling the character string pattern inputted from the input pattern section 12. The character string extracting section 16 is connected to this connection pattern extracting section 14.

This character string extracting section 16 extracts the labeled character string. The character size calculating section 18 is connected to this character string extracting section 16.

The character size calculating section 18 calculates an average character size on the basis of the character segment pattern of the character string extracted by the character string extracting section 16. The character size calculating section 18 is constructed of a size histogram section 32, a first average size section 34, a size area determining section 36 and a second average size section 38.

The size histogram section 32 calculates a histogram of a lengthwise or a crosswise size of each rectangle of the circumscribed rectangular character circumscribed with the segment pattern. The first average size section 34 calculates a lengthwise or crosswise average character size as a tentative average character size on the basis of the histogram obtained by the size histogram section 32.

The size area determining section 36 calculates such a character size that the histogram takes a MAX value in, e.g., a right area from the tentative average character size. The size area determining section 36 then determines such an area that the histogram takes MAX/2 or larger in the right-and-left directions of that character size. The second average size section 38 again calculates an average character size in the determined area.

The stroke extracting section 20 is connected to the second average size section 38.

The stroke extracting section 20 extracts a small separation stroke by use of the above average character size, an area condition and a height condition. The character pitch calculating section 21 is connected to this stroke extracting section 20.

The character pitch calculating section 21 calculates an average character pitch with respect to a segment pattern other than the small separation stroke, wherein an inter circumscribed rectangle distance serves as a pitch. The character pitch calculating section 21 is constructed of a pitch histogram section 21*a*, a first average pitch section 21*b*, a pitch area determining section 21*c* and a second average pitch section 21*d*.

The pitch histogram section 21*a* calculates a histogram of each of inter circumscribed rectangle pitches. The first average pitch section 21*b* calculates an average character pitch as a tentative average character pitch on the basis of the histogram obtained by the pitch histogram section 21*a*. The pitch area determining section 21*c* calculates such a character pitch that the histogram takes the MAX value in, e.g., the right area from the tentative average character pitch. The pitch area determining section 21*c* determines such an area that the histogram takes MAX/2 or larger in the right-and-left directions of that character pitch. The second average pitch section 21*d* again calculates the average character pitch in the determined area.

The integrating section 22 is connected to the stroke extracting section 20 and the character pitch calculating section 21. The integrating section 22 integrates the character on the basis of pieces of data about the extracted small separation stroke, the average character pitch, the average character size, the size variance value and the pitch variance value. The certainty factor integrating section 24 is connected to the integrating section 22.

The certainty factor integrating section 24 calculates distances between the small separation stroke and character patterns located on the right and left sides thereof. The certainty factor integrating section 24 quantifies a distance ratio therebetween as a certainty factor for integration and, if the certainty factor is high, effects the integration. A recognition processing section 26*a* is connected to this certainty factor integrating section 24.

The recognition processing section 26*a* performs a process aiming at handwritten numerals having the overhangs. The recognition processing section 26*a* integrates the character by simply distinguishing a line density, an inclination and a character size with respect to a small separation stroke, patterns located on the right and left sides thereof and a pattern obtained by integrating them. The recognition processing section 26*a* comprises a stroke line density section 42, an inclination calculating section 44, a distinguishing sections 46 and 50, a rectangular line density section 48 and multi-directional line density section 52.

The stroke line density section 42 calculates a line density with respect to the small separation stroke for distinguishing whether the character is written small or not. The inclination calculating section 44 is connected to this stroke line density section 42.

The inclination calculating section 44 calculates an X- or Y-directional inclination of the small separation stroke. The inclination calculating section 44 then distinguishes whether the inclination is defined as a separation stroke of 5 or 7 on the basis of the calculated inclination. Connected to this inclination calculating section 44 are the distinguishing section 46 and the rectangular line density section 48.

The distinguishing section 46 distinguishes whether or not a distance between the small separation stroke and a left rectangle is smaller than a-certain-threshold-value-times (e.g., 1.5 times) as large as a distance between the small separation stroke and the right rectangle with respect to the small separation stroke surely calculated as an angle of the number "5".

The rectangular line density section 48 calculates a line density of a right stroke of the small separation stroke. The rectangular line density section 48 distinguishes whether or not the right stroke is a right part of "7". Connected to this rectangular line density section 48 are the distinguishing section 50 and the multi-directional line density section 52.

The distinguishing section 50 distinguishes whether or not a distance between the small separation stroke and a left stroke in the vertical direction is smaller than a-certain-threshold-value-times (.e.g., 1.8 times) as large as an average crosswise size. The distinguishing section 50 also distinguishes whether or not an inclination of the separation stroke falls within a predetermined range. The distinguishing section 50, if the above distinguishing condition is satisfied, implements an integration as "5".

The multi-directional line density section 52, if the line density of the right stroke both in the vertical direction and in the horizontal direction is 1, calculates line densities in multi-directions.

Figure 4:
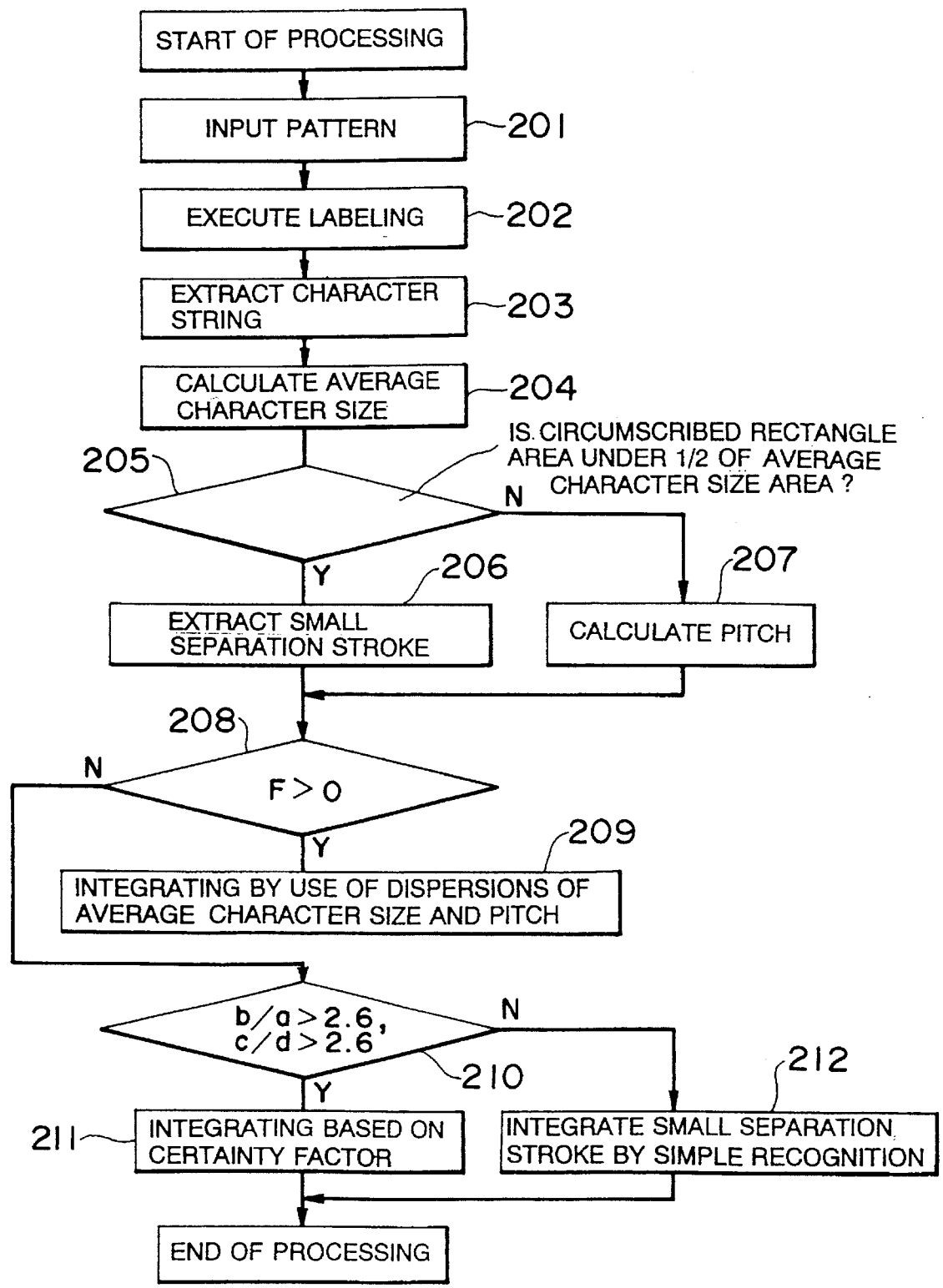
FIG. 4 is a flowchart showing the character segmenting method in accordance with the second embodiment of this invention.

Next, the character segmenting method in accordance with a second embodiment of the present invention will be explained. FIG. 4 is a flowchart showing the character segmenting method in accordance with the second embodiment of this invention. First, noises are eliminated by previously correcting an extreme inclination and rotation with respect to the pattern outputted from the input pattern section 12. This pattern is a binary image processed for covering a blur. Further, the character string pattern includes the overhang of the characters with each other and the separation stroke. The character string does not, however, contain an overlap and a contact of the characters with each other or a running-hand character.

Then, the character string pattern is inputted to the connection pattern extracting section 14 from the input pattern section 12 (step 201).

Next, the connection pattern extracting section 14, as illustrated in, e.g., FIG. 5, marks an 8-connection pattern with labeling numbers, thus effecting the labeling process (step 202).

At this time, afterward a problem relative to a size of the segment pattern obtained by labeling will exist. For this reason, the connection pattern extracting section 14, simultaneously with the above labeling process, as shown in FIG. 6, calculates circumscribed rectangular coordinate values of the segment pattern, i.e., coordinate values of left upper and right lower black dots. Then, the character string extracting section 16 extracts the segment pattern of the character string (step 203).

The segment pattern obtained by labeling is, if there is no character contact, one of a pattern consisting of one character and a small segment pattern consisting of a part of one character. A character average size is calculated for taking only the segment pattern consisting of one character out of these patterns.

Next, the character size calculating section 18 calculates an average character size on the basis of the circumscribed rectangle of each character pattern of the character string from the character string extracting section 16 (step 204).

Figure 7:
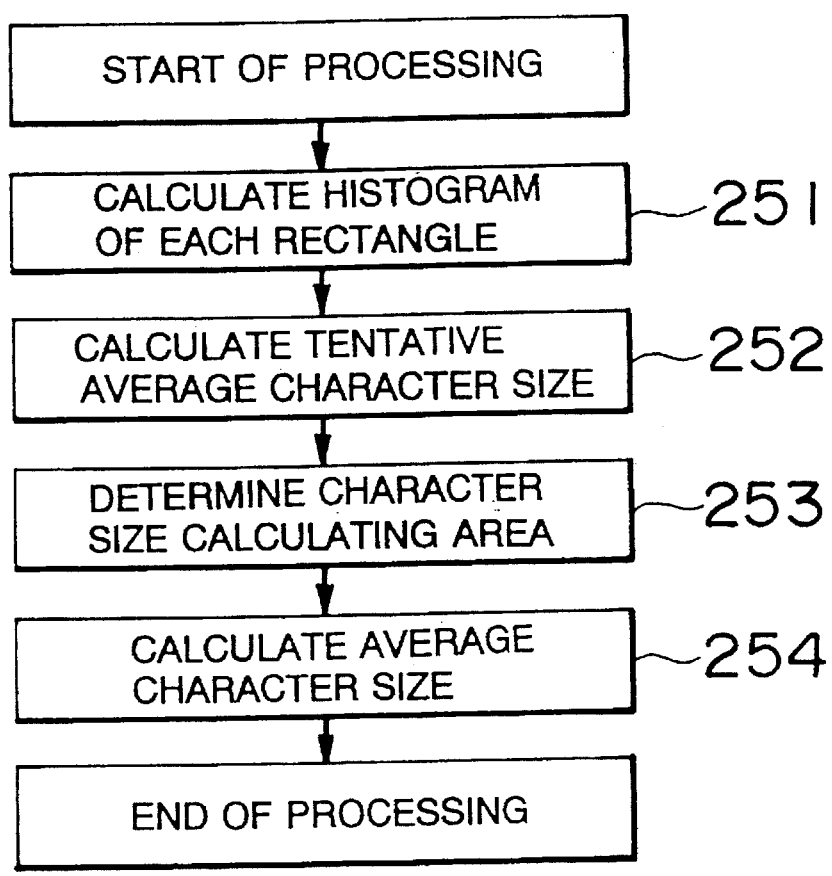
FIG. 7 is a flowchart showing how an average character size is calculated in the second embodiment of the present invention.

FIG. 7 is a flowchart for showing the calculation of the average character size in the second embodiment. As depicted in FIG. 7, the size histogram section 32 calculates a histogram of the lengthwise or crosswise character size of each circumscribed rectangle (step 251).

Figure 8A:
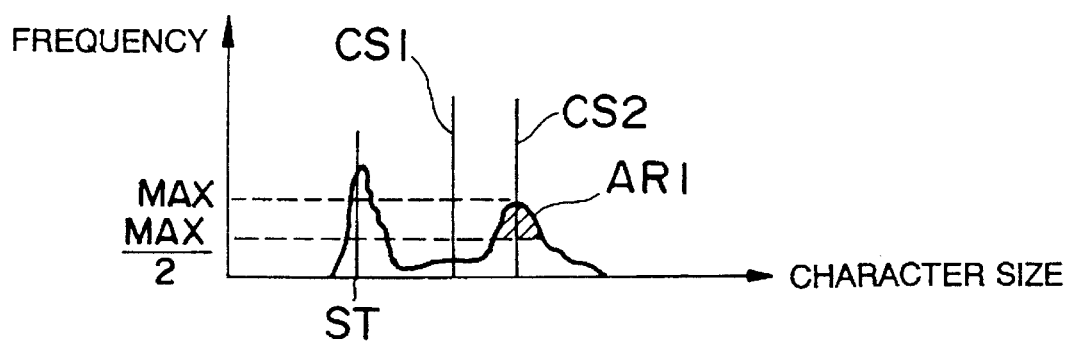
FIG. 8A is a diagram illustrating a histogram of a size exhibiting a bimodality due to a small separation stroke.

Then, the first average size section 34 calculates the lengthwise or crosswise average character size on the basis of the histogram. This size serves as a tentative average character size (step 252). At this time, as shown in FIG. 8A, the above histogram exhibits a bimodality due to a small separation stroke ST produced from points. For instance, the histogram exhibits the bimodality due to the small separation stroke produced from numbers such as "5" and "7". Alternatively, the histogram becomes bimodal because of the small separation stroke produced from alphabetic letters such as "A" and "E".

For this reason, a tentative average character size CS1 is calculated smaller than an average character size CS2. The size area determining section 36 calculates such a character size that the histogram takes the maximum value in the right area from the tentative average character size. The size area determining section 36 thus determines such an area AR1 that the histogram takes maximum value/2 or larger in the right-and-left directions of that character size (step 253)

Figure 8B:
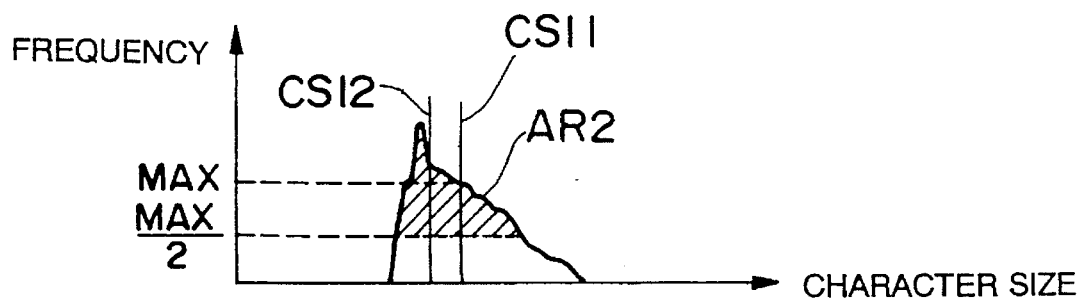
FIG. 8B is a diagram showing a histogram of a size in which a crest has a deviation.

Note that if, a crest of the histogram has, as illustrated in FIG. 8B, a deviation, the size area determining section 36 determines such an area AR2 that the histogram takes maximum value/2 or larger, wherein the histogram in the tentative character size CS11 takes the maximum value. Then, the second average size section 38 recalculates the average character size CS12 in the area determined by the size area determining section 36 (step 254)

Based on this method, the average character size can be calculated without undergoing any influence by the small separation stroke relative to the points. Further, as illustrated in FIG. 8, the average character size can be calculated without depending on a distribution of the histogram.

Next, the stroke extracting section 20 distinguishes whether or not the area of the circumscribed rectangle is not larger than ½ of the area of the above average character size by using the circumscribed rectangle which has already been extracted per stroke. The stroke extracting section 20 also distinguishes whether or not a height of the circumscribed rectangle is not larger than ⅘ of a height of the average character size (step 205).

Then, the stroke extracting section 20, when satisfying the two conditions of the area ratio and the height ratio, extracts the segment pattern of that circumscribed rectangle as a small separation stroke (step 206).

The crosswise size (breadth) is not herein taken into consideration. It is because, as in the small separation stroke of "5", a small separation stroke that is not different from the average size exists.

Figure 9:
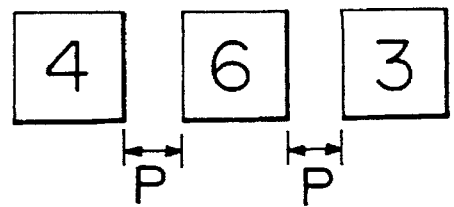
FIG. 9 is a diagram showing a pitch calculating method.

Next, as shown in FIG. 9, the character pitch calculating section 21 calculates, as a pitch, each inter circumscribed rectangle distance p with respect to the regarded-as-one-character segment pattern which is not determined to be the small separation stroke in the process of step 205. The character pitch calculating section 21 calculates a pitch histogram and, on the basis of a result thereof, calculates an average character pitch and its variance value (step 207).

Figure 10:
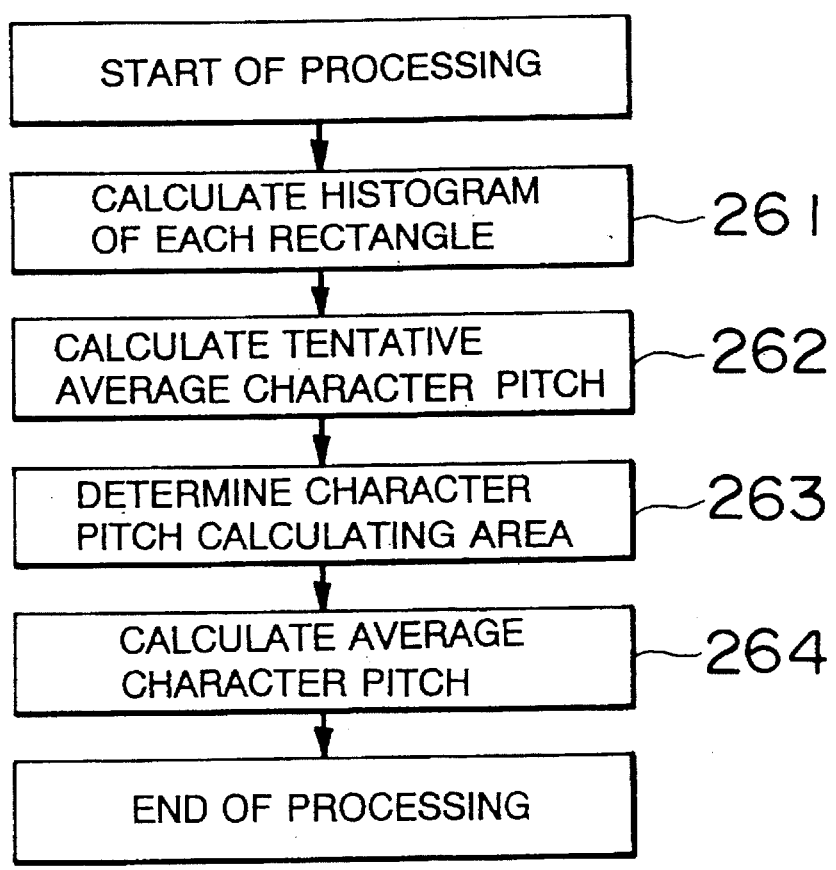
FIG. 10 is a flowchart showing how an average character pitch is calculated in the second embodiment of the present invention.

FIG. 10 is a flowchart showing how the average character pitch is calculated in the second embodiment. The calculation of the average character pitch will be explained in detail. At the first onset, the pitch histogram section 21a calculates a histogram of each inter circumscribed rectangle pitch (step 261). The first average pitch section 21b calculates the average character pitch as a tentative average character pitch on the basis of the pitch histogram (step 262). The pitch area determining section 21c calculates, for example, such a character pitch that the histogram takes the maximum value in the right area from the tentative average character pitch. The pitch area determining section 21c determines such an area that the histogram takes maximum value/2 or larger in the right-and-left directions of that character pitch (step 263). The average character pitch calculating section 21d recalculates the average character pitch in the determined area (step 264).

Next, the integrating section 22 distinguishes whether or not an evaluation function F expressed by the following formula is 0 or greater (step 208).

$$F = \frac{MP}{MW} - (\alpha * VP + \beta)$$

When F is 0 or greater, the character integration is conducted by use of values of the average character size, the average character pitch, the size variance and the pitch variance (step 209).

In the above formula, MP is the value of the average character pitch, MW is the value of the average character size, VP is the pitch variance value, $\alpha$ is 1.6, and $\beta$ is 0.5. The values of these parameters are given by way of one example.

Figure 11A:
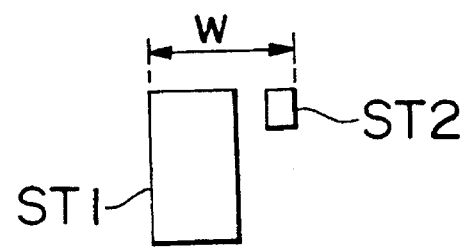
FIG. 11A is a diagram showing a character integration width.

A ratio of the average character pitch value to the average character size value represents a degree of space between the characters. Namely, the character integration is determined according to the value of the above ratio and the pitch variance value. Herein, a character integration width w is, as illustrated in FIG. 11A, a width extending from an integrating segment pattern ST1 to an integrated segment pattern ST2.

Figure 11B:
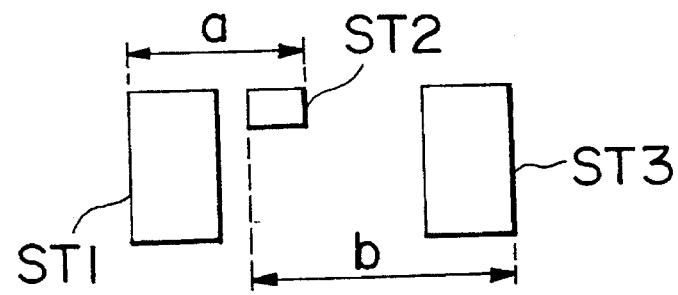
FIGS. 11B and 11C are diagrams each showing a character integration distance depending on a certainty factor.
Figure 11C:
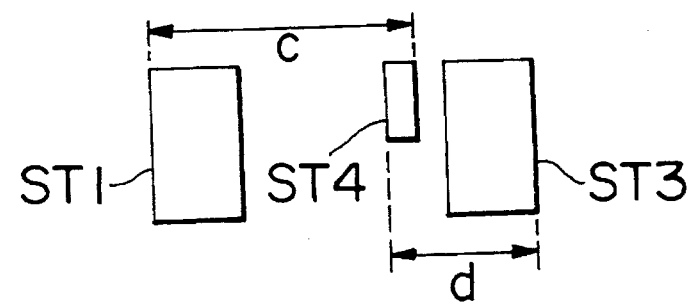

Next, in step 208, if the evaluation function F is 0 or smaller, and, for instance, when a value obtained by dividing the average character pitch by the-average character size is 1 or larger, the certainty factor integrating section 24 calculates distances between the extracted small separation stroke and patterns located on the right and left sides thereof. The certainty factor integrating section 24 quantifies a distance ratio therebetween as a certainty factor for integration and, if the certainty factor is high, effects the integration. The certainty factor integrating section 24, for example, as illustrated in FIGS. 11B and 11C, integrates the segment patterns based on the certainty factor by use of distances a, b, c, and d. Herein, the distance b between the small separation stroke ST2 and a right pattern ST3 is larger than a value that is 2.6 times the distance a between the small separation stroke ST2 and a left pattern ST1. Further, at the same time, if the distance c between a small separation stroke ST4 and the left pattern ST1 is larger than a value that is 2.6 times the distance d between the small separation stroke ST4 and a right pattern ST3 (step 210), the segment patterns based on the certainty factor are integrated (step 211).

Next, in step 210, the distance b is set smaller than a value that is 2.6 times the distance a, and the distance c is set smaller than a value that is 2.6 times the distance d. In this case, when an aspect ratio of the small separation stroke is larger than 2.6, the recognition processing section 26 integrates the small separation stroke with a limitation to the numbers (step 212).

The recognition processing section 26 distinguishes whether or not the small separation stroke is a small segment pattern consisting of one character or a part of the character without using the pattern matching method. This recognition processing section 26 does not require complicated processing and is therefore capable of performing the process at a high speed.

Figure 12:
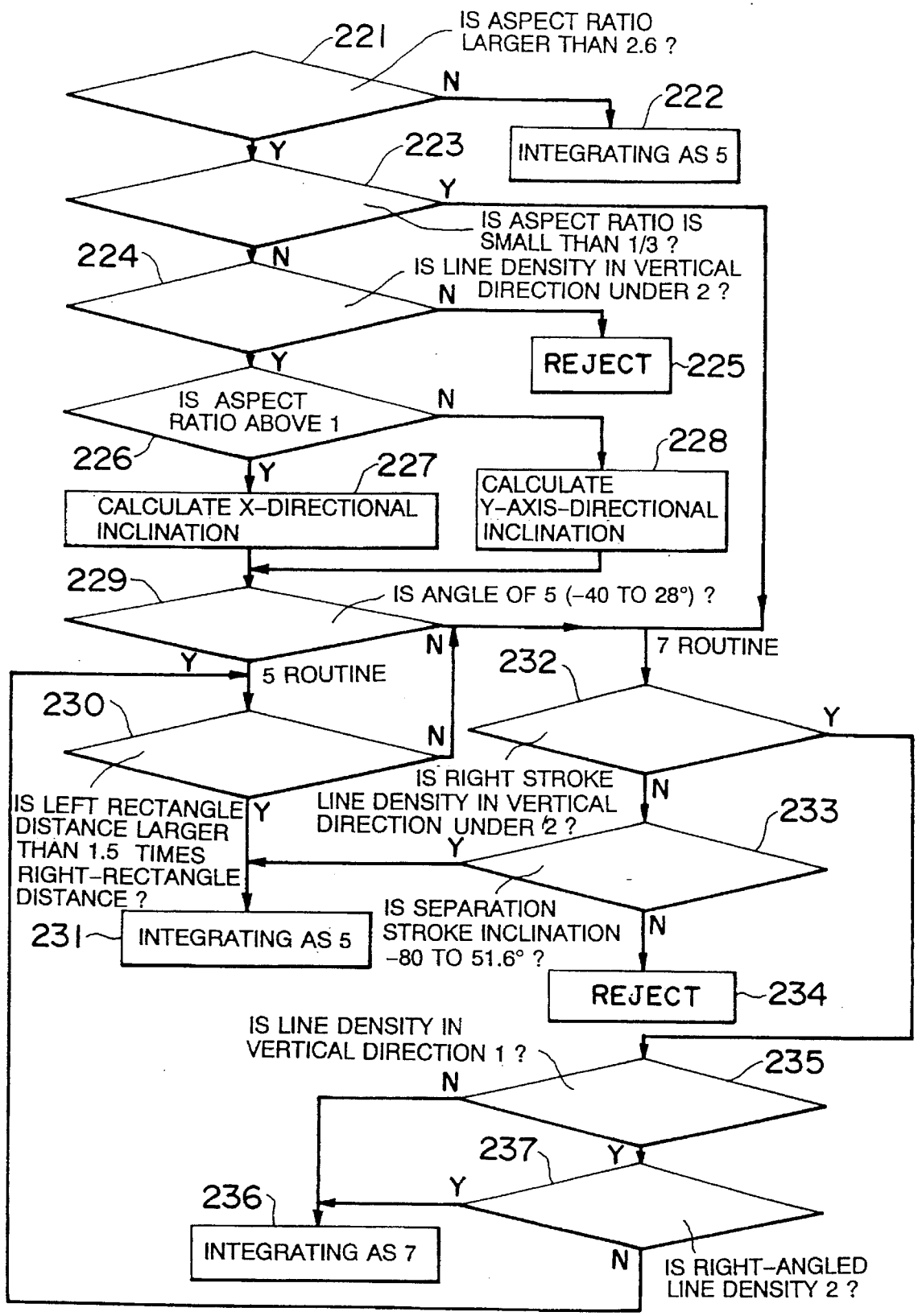
FIG. 12 is a flowchart showing an integration of the small separation strokes through a simple recognition.

Next, processing by the recognition processing section 26 will be explained in detail. FIG. 12 is a flowchart showing an integration of the small separation stroke on the basis of a simple recognition. To start with, the stroke line density section 42, if the aspect ratio of the small separation stroke is larger than 2.6, integrates the small separation stroke as "5" (step 221). Then, if the aspect ratio of the small separation stroke is smaller than 2.6, the stroke line density section 42 distinguishes whether or not the aspect ratio of the small separation stroke is smaller than ⅓ (step 223). If smaller than ⅓, the action proceeds to a routine of "7", i.e., step 232. If larger than ⅓, a line density is calculated.

The small separation stroke to be extracted is confined to a small separation stroke of a small-written character or the number of "5" or "7". For this reason, the stroke line density section 42 calculates a line density with respect to the small separation stroke in order to distinguish the small separation stroke of one small-written character from the separation stroke of "5" or "7".

FIGS. 13A–13B are diagrams showing a method of calculating the line density. As illustrated in FIGS. 13A–13B, the stroke line density section 42 checks whether the circumscribed rectangle is elongated laterally or vertically. The stroke line density section 42, if the circumscribed rectangle is, as shown in FIG. 13A, for instance, laterally elongate, equally divides the circumscribed rectangle into four segments in the vertical direction. The stroke line density section 42 calculates a line density representing the number of intersections between the numeral 3 and two lines L1 and L3 other than a central line L2. In this case, the line density on the line L1 is 1, while the line density in the line L3 is 2. As shown in FIG. 13B, if the circumscribed rectangle is vertically elongated, the stroke line density section 42 equally divides the circumscribed rectangle in the horizontal direction and similarly calculates the line density.

Note that the stroke line density section 42 equally divides the circumscribed rectangle by n and may calculate, as a line density, the maximum value of a plurality of line densities counted from an nth line to an (n–m)th line.

Herein, when the line density is calculated in the horizontal direction of the laterally elongated stroke as shown in FIG. 14, it follows that an incorrect line density is calculated. Therefore, the line density calculating method is varied corresponding to a shape of the circumscribed rectangle.

The stroke line density section 42 is capable of calculating an accurate line density without undergoing an influence by a rugged pattern.

Then, the stroke line density section 42 distinguishes whether or not the line density in the vertical direction is not more than 2 and whether or not the line density in the horizontal direction is not more than 1 (step 224). If this determination condition is not satisfied, the relevant stroke is not regarded as a small separation stroke and is therefore REJECTed (step 225).

If the foregoing determination condition is satisfied, the stroke line density section 42 distinguishes whether or not the aspect ratio of the small separation stroke is 1 or larger (step 226). If this determination condition is met, the inclination calculating section 44 calculates an inclination of the small separation stroke in an X-direction (horizontal direction) (step 227). If the above determination condition is not met, the inclination calculating section 44 calculates an inclination of the small separation stroke in an Y-direction (vertical direction) (step 228).

FIGS. 15A–15B are diagrams showing a method of calculating the inclination of the small separation stroke. The inclination calculating section 44, as illustrated in FIGS. 15A–15C, equally divides the circumscribed rectangle. The inclination calculating section 44 calculates a first point-of-intersection CP1 between a first line L1 and the stroke ST. The inclination calculating section 44 also calculates a second point-of-intersection CP2 between a third line L3 and the stroke ST. The inclination calculating section 44, when connecting the first point-of-intersection CP1 to the second point-of-intersection CP2, an inclination of this stroke in the X-direction. As a matter of fact, the stroke has a certain width, and, therefore, a mid-point of the stroke width is selected as the above point-of-intersection.

The small separation stroke inclination calculating method is also classified depending on whether the circumscribed rectangle is elongate laterally or vertically as in the case of the line density calculating method. As shown in FIG. 15C, when the inclination of the small separation stroke is calculated in the horizontal direction with respect to the laterally elongate circumscribed rectangle, an error of inclination may happen in some cases.

As described above, the direction of calculating the inclination is varied depending on whether the circumscribed rectangle is elongate laterally or vertically, whereby a proper inclination can be calculated.

Based on the calculated inclination, the inclination calculating section 44 next distinguishes whether the inclination falls within a range of angle of the separation stroke of "5" or within a range of angle of the separation stroke of "7" (step 129). The range of angle of the separation stroke of "5" is –40° to 28°.

Figures 16A, 16B, 16C:
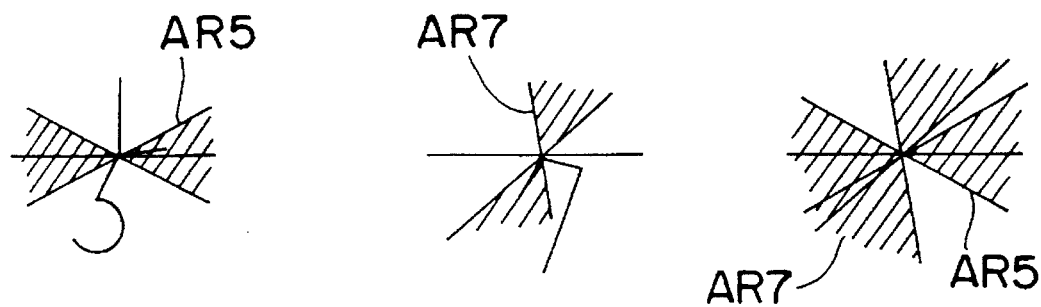
FIG. 16A is a diagram showing an angle range of the small separation stroke of "5"
FIG. 16B is a diagram showing an angle range of the small separation stroke of "7"
FIG. 16C is a diagram showing a contrary relationship between the angle range shown in FIG. 16A and the angle range shown in FIG. 16B.

When "5" is handwritten, the range of angle of the separation stroke is a range AR5 indicated by hatching in FIG. 16A. When "7" is handwritten, the range of angle of the separation stroke is a range AR7 indicated by hatching in FIG. 16B. The range AR5 of angle of the separation stroke of "5" is, as shown in FIG. 16C, in a contrary relationship with the range AR7 of angle of the separation stroke of "7".

Herein, a distribution of angle of the small separation stroke of "7" is wider than a distribution of angle of the small separation stoke of "5". Then, the distinguishing section 46, when discriminating between "5" and "7", distinguishes whether or not a distance between a left rectangle and the small separation stroke certainly calculated as an angle of "5" is smaller than a value that is 1.5 times a distance between a right rectangle and the small separation stroke (step 230).

When this determination condition is satisfied, the small separation stroke is integrated as "5" with the left rectangle (step 231). Incidentally, whereas if this determination condition is not satisfied, the process proceeds to a routine of "7" in step 232.

Note that the distinguishing section 46 examines a character size when the small separation stroke certainly calculated as an angle of "5" is integrated with the left rectangle. The distinguishing section 46 may integrate, if that character size is not larger than a-predetermined- value-times as large as the average character size, the small separation stroke as "5" with the left rectangle.

Figure 17A:
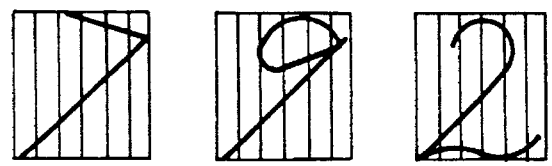
FIG. 17A is a diagram showing a method of calculating the line density in the vertical direction.
Figure 17B:
FIG. 17B is a diagram showing the method of calculating the line density in the horizonal direction.

On the other hand, in step 229, the small separation stroke is calculated as an angle of "7". In step 230, the character size exceeds a-predetermined-value-times the average character size. In these cases, the following processes are to be executed. First, the rectangular line density section 48 calculates a line density of the right stroke of the small separation stroke and distinguishes whether or not the right stroke is identical with a right part of "7". The rectangular line density section 48, as illustrated in FIG. 17A, checks a line density of each stroke in the vertical direction to discriminate between a right pattern of "7" and "2" or "9". Further, the rectangular line density section 48, as shown in FIG. 17B, checks a line density of each stroke in the horizontal direction to discriminate between the right pattern of "7" and "2" or "9".

Then, the rectangular line density section 48 distinguishes whether or not the line density of the right stroke in the vertical direction is not greater than 2 and whether or not the line density in the horizontal direction is not greater than 1 (step 232). As a result of calculating the line density, if the condition is not met, the distinguishing section 50 distinguishes whether or not a distance between the small separation stroke and a left stroke is smaller than 1.8 times the average crosswise size and whether or not an inclination of the small separation stroke is −80° to 51.6° (step 233). If these conditions are satisfied, the integration thereof is effected as 5 (step 231). Whereas if not satisfied, that is REJECTed (step 234).

On the other hand, the line density of the right stroke in the vertical direction is 2, and the line density in the horizontal direction is 1 (steps 232 and 235). In this case, a possibility of being "7" exists. For this reason, a character size when integrating the right stroke with the small separation stroke is examined. If that character size is not more than a-certain-threshold-value-times as large as the average character size, the small separation stroke is integrated as 7 (step 236).

On the other hand, the line density is calculated by the above method with respect to a right pattern PT1 shown in FIG. 18A. In this case, as shown in FIG. 18A, the line density in the vertical direction is "1", and the line density in the horizontal direction is "1".

Hence, in step 235, when the line densities both in the vertical direction and in the horizontal direction are 1, the multi-directional line density section 52 recalculates the line density by the following method in order to confirm whether or not the right pattern having the line density to be calculated is identical with a right pattern of "7".

The multi-directional line density section 52 sees, as illustrated in FIG. 18C, the line density in the vertical direction from the center of breadth of the circumscribed rectangle with respect to the right pattern PT1 shown in FIG. 18B. The multi-directional line density section 52 sees the line density in the horizontal direction when the line density in the vertical direction is counted. Next, the multi-directional line density section 52 distinguishes whether a right-angled line density is 2 or not (step 237). The right pattern PT1 in which the right-angled line density is 2 is integrated as 7 (step 236). Note that the multi-directional line density section 52 calculates a line density in the multi-directions with respect to such a pattern PT2 that the line density in the vertical direction is, as shown in FIG. 18D, "1", and the line density in the horizontal direction is "1". Then, as illustrated in FIG. 18E, the multi-directional line density becomes 1.

It is possible to perform the pattern distinction which could not hitherto be done by only one-directional searching by seeing, as described above, the line density in the right-angled directions. Further, the right-angled line densities of the character "7" shown in FIG. 17F and of "L" shown in FIG. 18G become 2. The multi-directions with respect to "4" shown in FIG. 18H may not be the right-angled directions.

Figure 19:
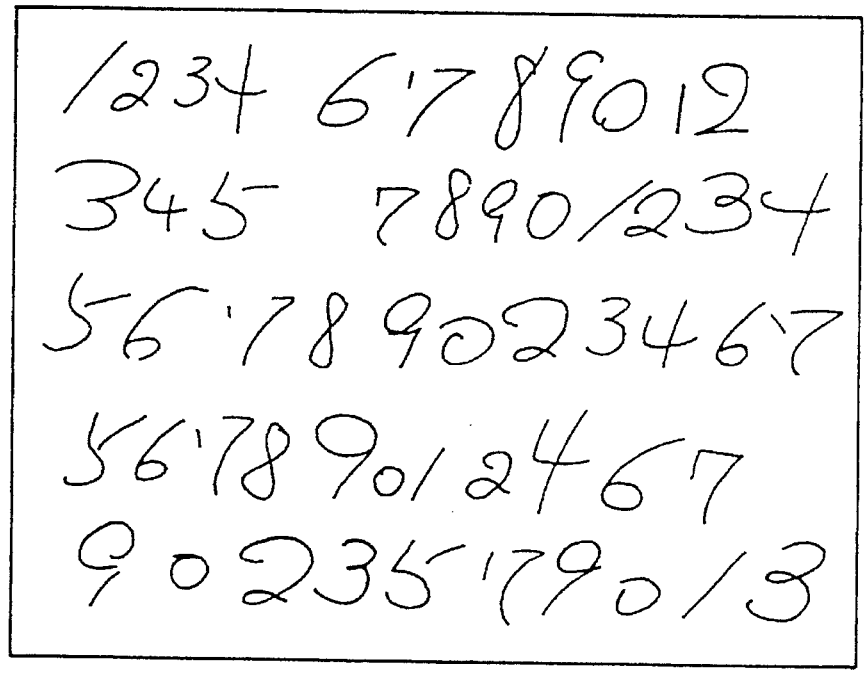
FIG. 19 is a diagram showing one example of a result of the character segmentation.

Further, in step 237, if the right-angled line density is a value other than 2, and when the character size is REJECTed, a possibility in which the right pattern is to be the small separation stroke of "5"still exists. In this instance, the process returns to step 230 as a routine of 5, wherein a character size when the right pattern is integrated as 5 is examined. Subsequently, if the condition is satisfied, the character is integrated. Whereas if not satisfied, that is REJECTed. FIG. 19 shows one example of a result of the character segmentation.

As explained above, according to the character segmenting apparatus in accordance with the embodiment 2, the average character size and the average character pitch are strictly calculated with respect to the character string in which the indefinite pitch and the character size fluctuate. The integrating section 22, when integrating the character, adaptively changes the integration conditions in accordance with the values of the average character size and the average character pitch and also their variance values. Hence, the character segmentation can be conducted with a high accuracy.

Especially for the character string of the handwritten numerals, the pattern matching method is not employed but the simple recognizing process in which the attention is paid to the small separation stroke. The precise and high-speed processing can be done. That is, the stroke extracting section 20 performs the small separation stroke oriented processing without effecting the uniform processing with respect to all the patterns in the character string. Consequently, the character segmenting process can be implemented at the high speed.

Further, the character size calculating section 18 calculates the histogram of the widths of all the circumscribed rectangles in the character string and tentatively calculates the average character size. The character size calculating section 18 accurately calculates the character size on the basis of the value thereof. Accordingly, even if the character size in the character string largely fluctuates, or if the character string has the overhang, the average character size can be calculated more accurately. As a result, the character integration can be exactly done.

Moreover, the conditions on the occasion of integrating the small separation stroke are adaptively varied corresponding to the average values of the character size and the character pitch and their variance values in the character string. Hence, even when the character size and the character pitch fluctuate, more accurate integration can be conducted.

Further, when the small separation stroke of the points or the numerals exists, the small segment patterns thereof are contained in the segment pattern, thus calculating the inter-character pitch. Then, a pitch smaller than the actual pitch is calculated. The character pitch calculating section 21 calculates the character pitch with respect to the segment pattern exclusive of the small separation stroke and is therefore capable of calculating a more precise pitch.

The threshold value when integrating the separation stroke is adaptively varied depending on the regularity of arranging the characters in the character string, and, therefore, the more accurate character integration can be effected. Furthermore, if there is no regularity in terms of arranging the characters in the character string, the certainty factor integrating section 24 quantifies, as a certainty factor, the distance ratio between the separation stroke and the patterns located on the right and left sides thereof. The certainty factor integrating section 24 integrates the character in accordance with the value thereof and is therefore capable of performing the precise integration.

Figure 20:
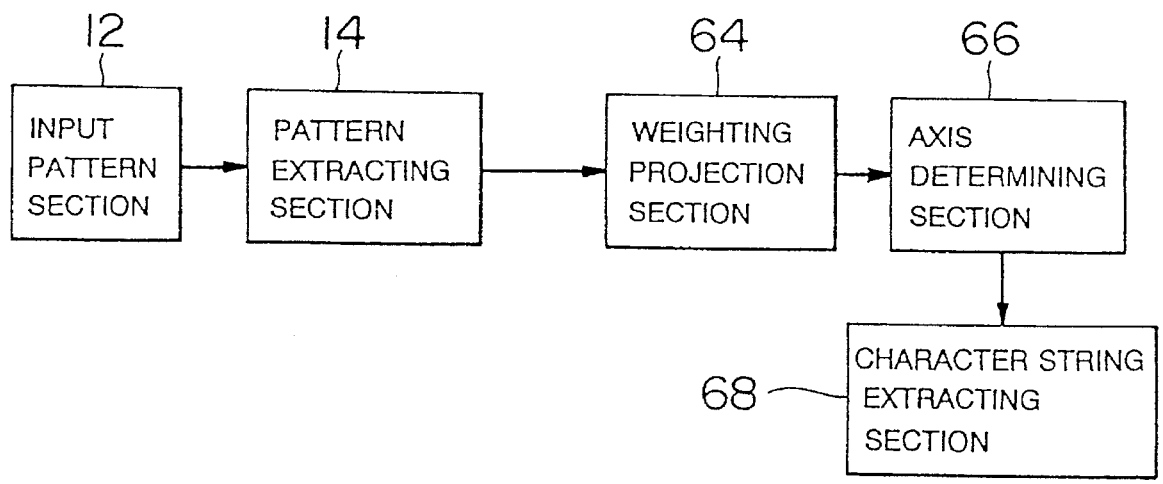
FIG. 20 is a block diagram illustrating a construction of a character string extracting apparatus in accordance with the first embodiment of this invention.

Explained next are a character string extracting apparatus and method in accordance with the embodiment 1 of the present invention. FIG. 20 is a block diagram illustrating a construction of the character string extracting apparatus in accordance with the embodiment 1 of this invention.

The character string extracting apparatus of the present invention extracts each character string from a plurality of character strings. The character string extracting apparatus comprises an input pattern section 12, a connection pattern extracting section 14, a weighting projection section 64, an axis determining section 66 and a character string extracting section 68.

The input pattern section 12 includes a plurality of character string patterns. Each character string pattern is formed by arranging a plurality of character segment patterns. The connection pattern extracting section 14 is connected to the input pattern section 12.

The connection pattern extracting section 14 extracts only a connection pattern by labeling each character string pattern of the plurality of character string patterns inputted from the input pattern section 12. A circumscribed rectangle of each pattern is thereby obtained. The wieghting projection section 64 is connected to the connection pattern extracting section 14.

The weighting projection section 64 performs a weighting projection on a lengthwise or crosswise line segment of the circumscribed rectangle circumscribed with the segment pattern extracted by the connection pattern extracting section 14, thus obtaining a projection histogram. The axis determining section 66 is connected to the weighting projection section 64.

The axis determining section 66 determines an axis of the character string on the basis of the projection histogram obtained by the weighting projection section 64. The character string extracting section 68 is connected to the axis determining section 66. The character string extracting section 68 extracts a character string on the basis of the character string axis determined by the axis determining section 66.

Figure 21:
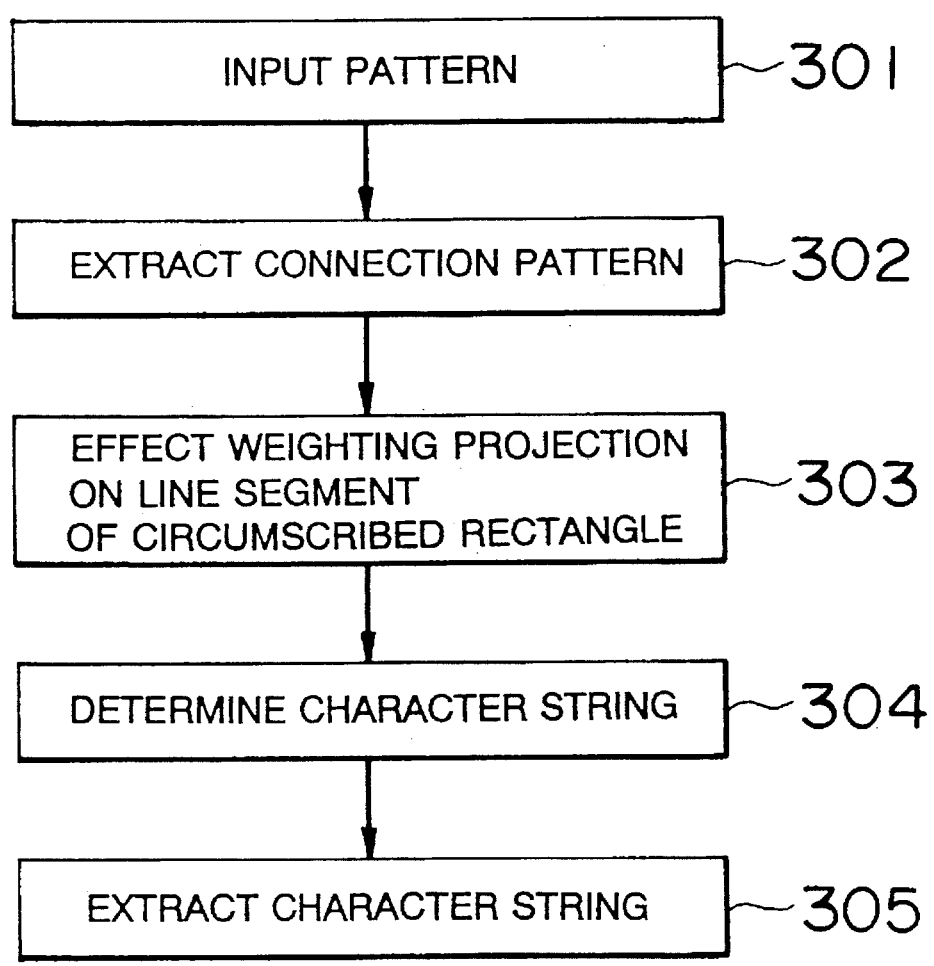
FIG. 21 is a constructive block diagram illustrating a character string extracting method in accordance with the embodiment of this invention.

Next, the character string extracting method in accordance with the embodiment 1 of this invention will be explained. FIG. 21 is a flowchart showing the character string extracting method in accordance with the embodiment 1 of this invention. To start with, the connection pattern extracting section 14 inputs each of the plurality of character string patterns from the input pattern section 12 (step 301). The connection patten extracting section 14 extracts only the connection pattern by labeling each of the inputted character string patterns, thereby obtaining a circumscribed rectangle of each pattern (step 302).

Next, the weighting projection section 64 obtains the projection histogram by effecting the weighting projection on the lengthwise or crosswise line segment of the circumscribed rectangle circumscribed with the extracted segment pattern (step 303). Then, the axis determining section 66 determines the character string axis on the basis of the projection histogram (step 304). The character string extracting section 68 extracts the character string on the basis of the axis of the character string (step 305).

Accordingly, a plurality of character strings are contiguous to each other, and, even if a part of the character belongs to other character string, the character string can be extracted at the high speed with the high accuracy.

Figure 22:
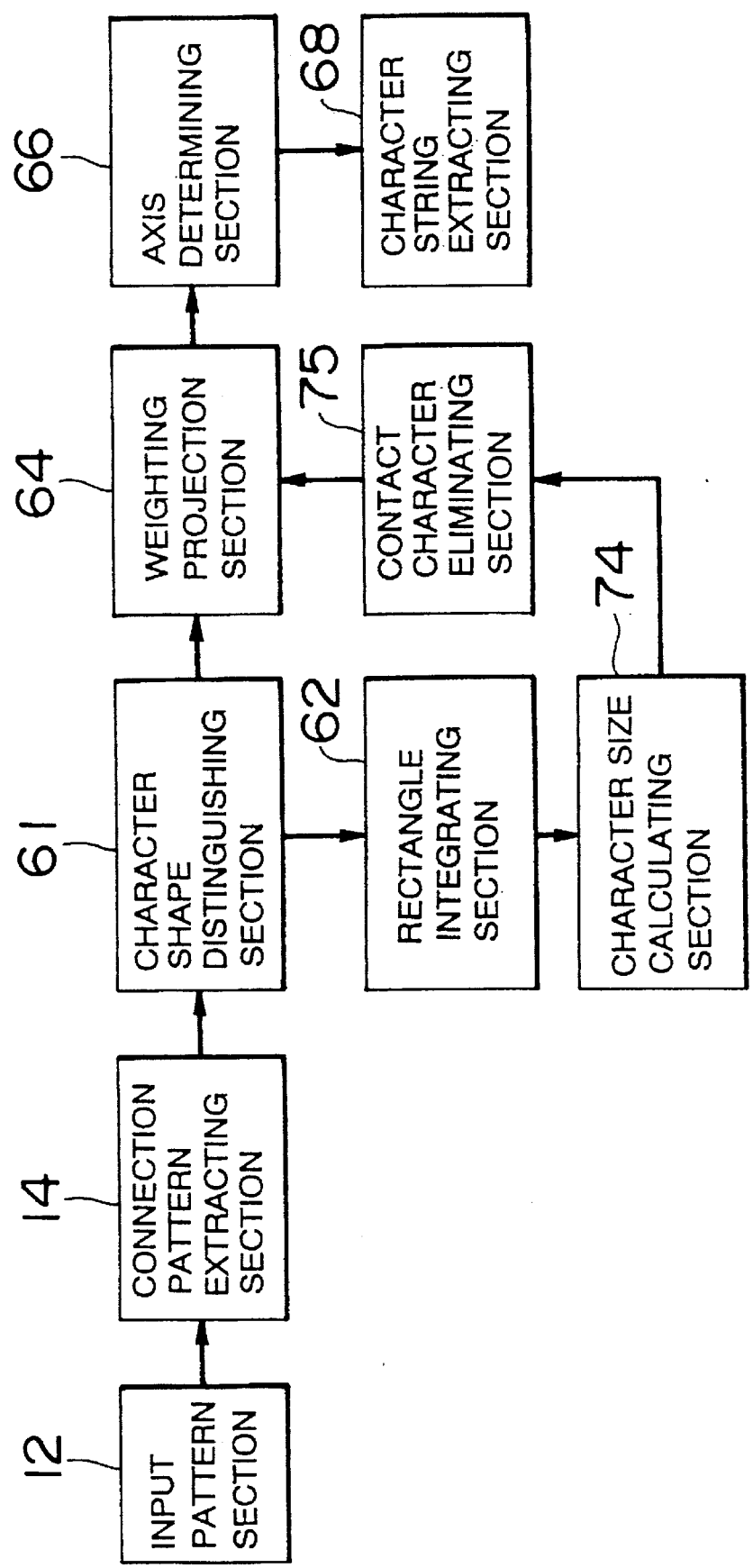
FIG. 22 is a block diagram illustrating a construction of the character string extracting apparatus in accordance with a second embodiment of this invention.

Given next is an explanation of a character string extracting apparatus and method in accordance with the second embodiment of the present invention. The second embodiment will hereinafter be discussed with reference to the drawings. FIG. 22 is a block diagram illustrating a construction of the character string extracting apparatus in accordance with the second embodiment of this invention. The character string extracting apparatus comprises the input pattern section 12, the connection pattern extracting section 14, a character shape distinguishing section 61, a rectangle integrating section 62 and a character size calculating section 74. The character string extracting apparatus also comprises a contact character eliminating section 75, the weighting projection section 64, the axis determining section 66 and the character string extracting section 68.

The input pattern section 12 includes the plurality of character string patterns. Each character string pattern is formed by arranging the plurality of character segment patterns. The connection pattern extracting section 14 extracts only the connection patterns by labeling the plurality of character string patterns inputted from the input pattern section 12. A circumscribed rectangle of each pattern is thereby obtained. The character shape distinguishing section 61 is connected to this connection pattern extracting section 14.

The character shape distinguishing section 61 distinguishes whether or not the character pattern extracted by the connection pattern extracting section 14 assumes a complicated shape. Connected to the character shape distinguishing section 61 are the rectangle integrating section 62 and the weighting projection section 64.

The rectangle integrating section 62 integrates overlapped circumscribed rectangles when the circumscribed rectangles are overlapped with each other. An output of this circumscribed rectangle integrating section 62 is connected to the weighting projection section 64.

The weighting projection section 64 calculates the projection histogram by performing the projection weighted on the center of height with respect to that circumscribed rectangle. The character string axis determining section 66 is connected to this wieghting projection section 64.

The axis determining section 66 determines, as an axis of character string, an axis connecting respective peak values to each other by searching peak values on the basis of the projection histogram obtained by the weighting projection section 64. The character string extracting section 68 is connected to this axis determining section 66.

The character string extracting section 68 extracts the character string on the basis of the character string axis determined by the axis determining section 66. The character size calculating section 74 is connected to the rectangle integrating section 62.

The character size calculating section 74 calculates an average character size with respect to a result of the integration by the rectangle integrating section 62. The contact character eliminating section 75 is provided between the character size calculating section 74 and the weighting projection section 64.

The contact character eliminating section 75 eliminates, in the form of a group of contact characters, the circumscribed rectangles that are not less than a-predetermined-value-times as large as the average character size. For example, the characters contact each other between the upper and lower or right and left character strings, and if it is known beforehand that the character sizes of input data are substantially uniform, the contact character eliminating section 75 and the character size calculating section 74 are employed.

Figure 23:
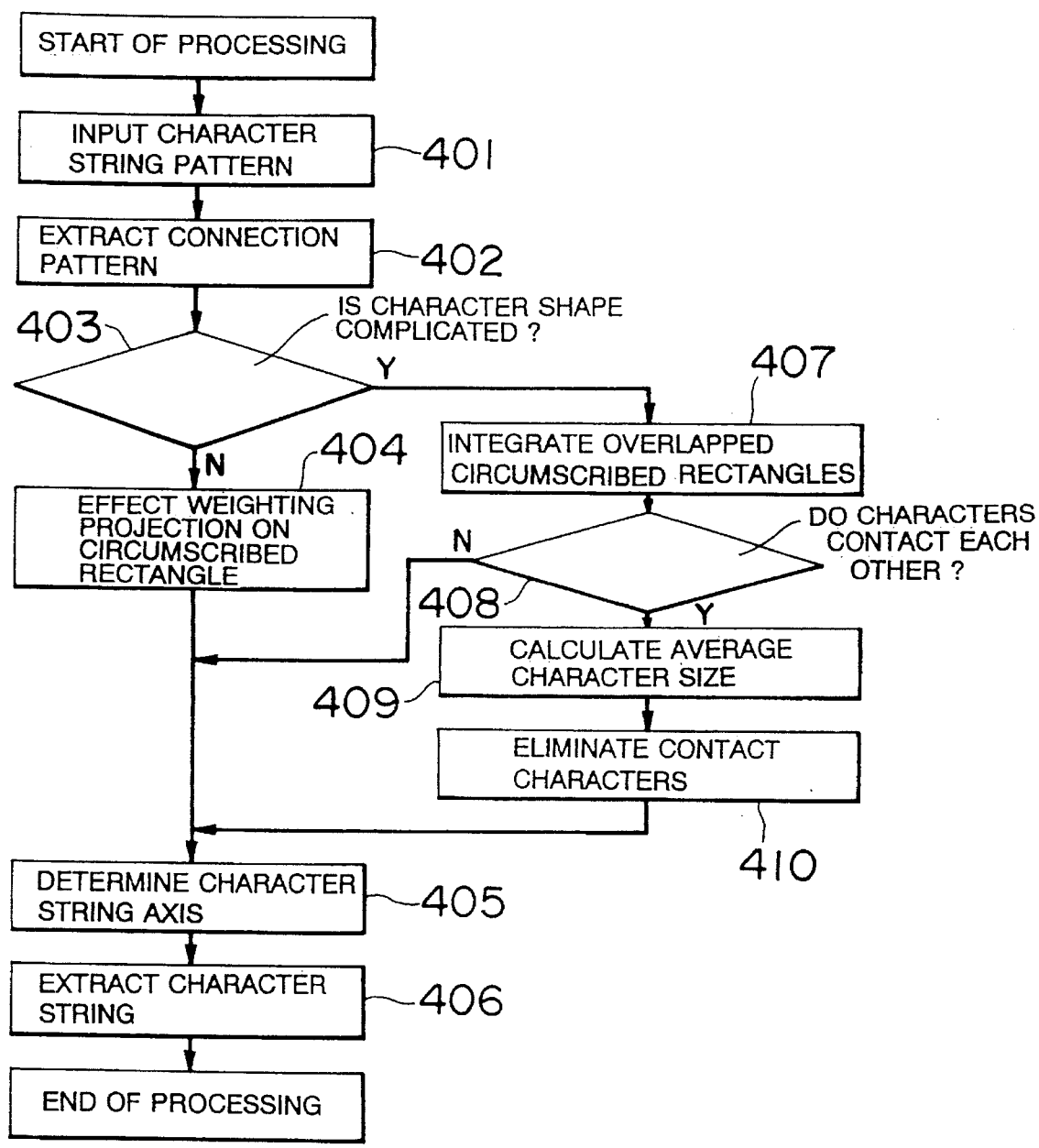
FIG. 23 is a flowchart showing the character string extracting method in accordance with the second embodiment of this invention.

The character string extracting method in accordance with the embodiment 2 will hereinafter be described with reference to the drawings. FIG. 23 is a flowhart showing the character string extracting method in the embodiment 2 of this invention.

To begin with, the connection pattern extracting section 14 inputs the character string pattern from the input pattern section 12 (step 401).

Figure 24:
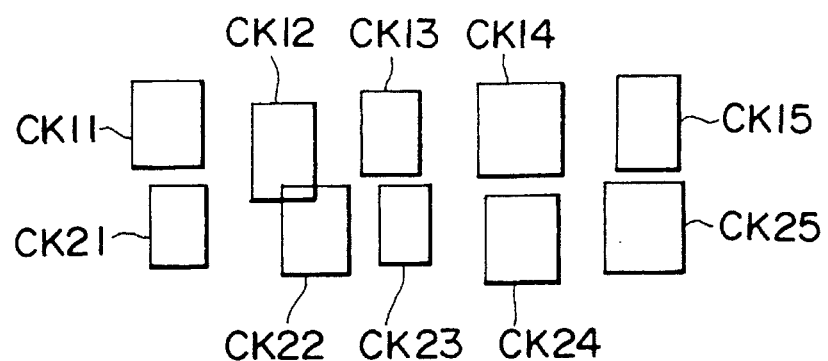
FIG. 24 is a diagram illustrating the circumscribed rectangles of respective characters in the second embodiment.

Then, the connection pattern extracting section 14 for distinguishing the patterns from each other extracts an 8-connection pattern by labelling. Simultaneously, the connection pattern extracting section 14 obtains, as illustrated in FIG. 24, circumscribed rectangles CK11– CK15 and CK21–CK25 of each pattern (step 402). Herein, the circumscribed rectangles CK11–CK15 correspond to the character string of a first row, while the circumscribed rectangles CK21–CK25 correspond to the character string of a second row.

Figure 25:
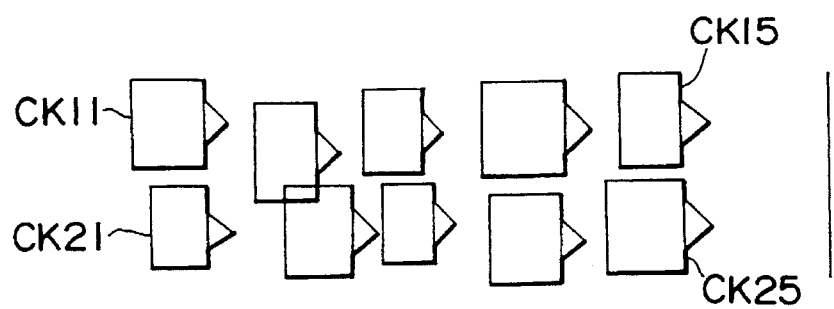
FIG. 25 is a diagram showing a weighting projection in the second embodiment.

Next, the character shape distinguishing section 61 distinguishes whether or not the character takes a complicated shape (step 403). Herein, if the character assumes a simple shape, as illustrated in FIG. 25, the weighting projection section 64 next performs the wieghting projection on the center of height with respect to that circumscribed rectangle (step 404). A value of weighting has a peak at the center of height but attenuates as it approaches the peripheral portions. At this time, if it is presumed that the weighting value exists over the whole height line segment, no trough may be produced in the projected histogram in some cases.

For this reason, it is assumed that the weighting value is n % (n; real number) of the whole height line segment. Turning to FIG. 25, the weighting value takes a triangular shape in consideration of speeding up the processing. The projection histogram obtained as a result of the projection comes to have a comparatively clear peak value.

Figure 26:
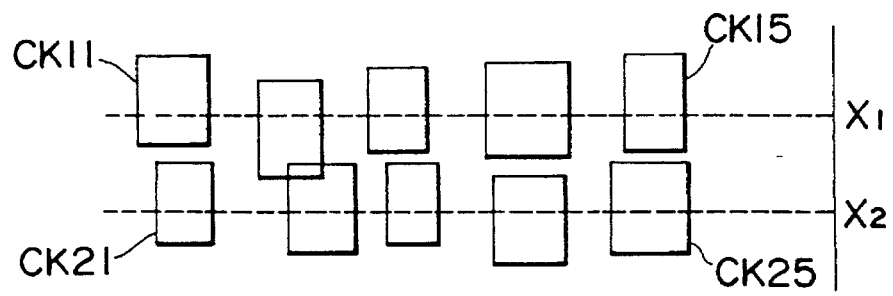
FIG. 26 is a diagram showing a character string axis.

The axis determining section 66 determines, as an axis of the character string, an axis connecting the respective peak values to each other by searching the peak values thereof on the basis of the projection histogram (step 405). For example, FIG. 26 shows the thus determined character string axes $X_1$ and $X_2$.

Subsequently, the character string extracting section 68 calculates distances between the respective circumscribed rectangles and the character string axes. The character string extracting section 68 extracts the character string by making the circumscribed rectangle belong to the character string axis exhibiting a minimum distance (step 406).

On the other hand, in step 403, if the character pattern takes the complicated shape, the clear peaks do not appear even when effecting the weighting projection. Then, as a pre-process of the projection, the rectangle integrating section 62 integrates the circumscribed rectangles with each other if the circumscribed rectangles are overlapped with each other (step 407).

After performing this integrating process, it is distinguished whether or not the characters contact between the upper and lower or right and left character strings (step 408). If the characters do not contact each other, the process proceeds to step 405.

On the other hand, when the characters contact each other between the upper and lower or right and left character strings, and if it is known beforehand that the character sizes in the input data are substantially uniform, the character size calculating section 74 calculates the average character size by use of the result of integrating the circumscribed rectangles with each other (step 409). The contact character eliminating section 75 eliminates the contact character group defined as the circumscribed rectangle having a size larger on the basis of the calculated average character size (step 410). After eliminating this contact character group, the weighting projection section 64 executes processing.

A clear projection histogram is obtained by the above integrating process. Further, the character string is extracted at the high speed with the high accuracy by the wieghting projection. Moreover, even if the character takes the intricate shape, and if the characters contact each other, the contact character group is eliminated. Hence, the character string is accurately extracted.

Figure 27:
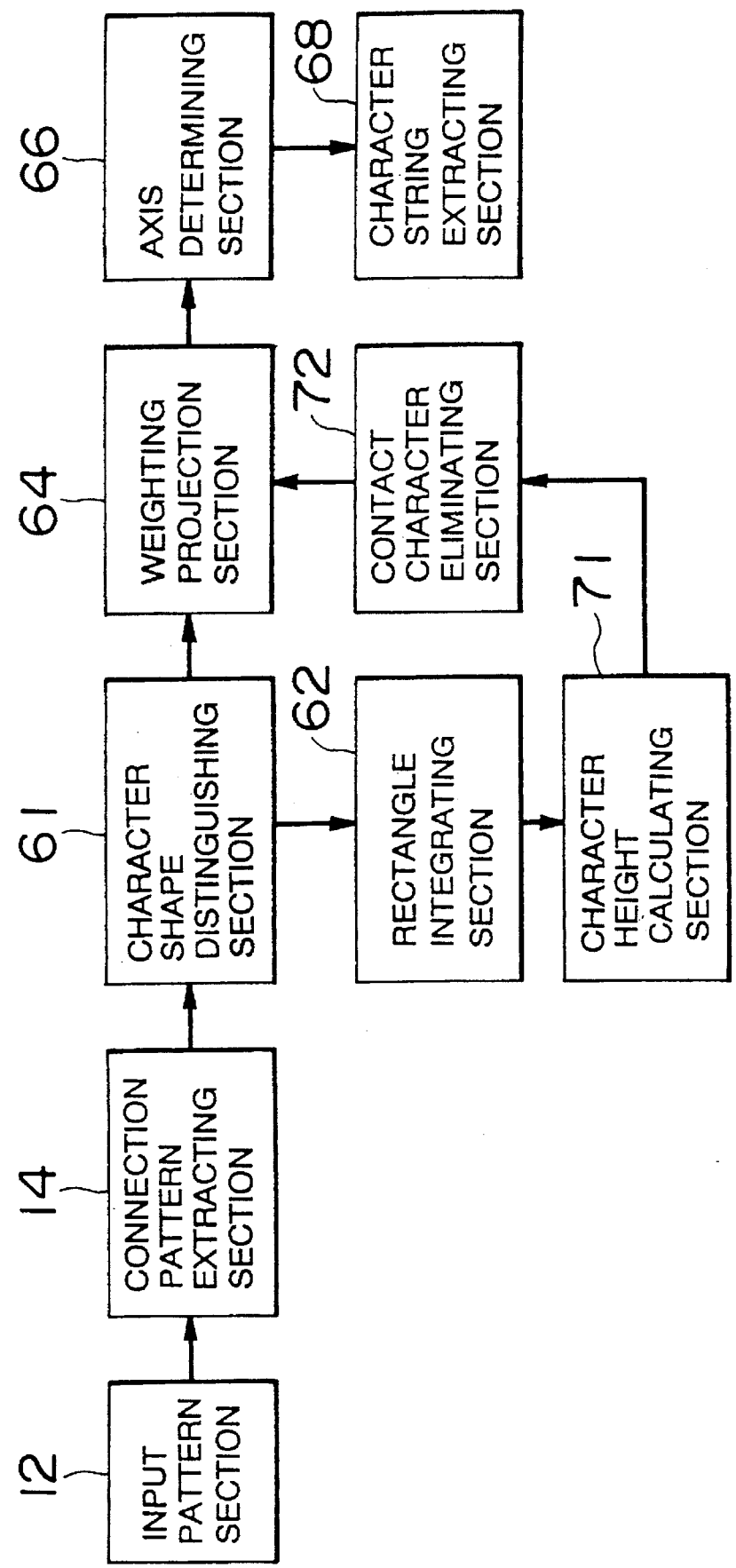
FIG. 27 is a block diagram illustrating a construction in an example of variant from of the character string extracting apparatus in accordance with the second embodiment of this invention.

Note that the character string extracting apparatus shown in FIG. 27 may be used by way of an example of variant form of the second embodiment. In the example of variant form of the second embodiment, the apparatus comprises a character height calculating section 71 connected to the rectangle integrating section 62 and a contact character eliminating section 75 connected to the character height calculating section 71 as well as to the weighting projection section 64. The construction of others is the same as the construction of the second embodiment. This example of variant form is available in such a case that the characters contact each other between the upper and lower or right and left character strings, and it is previously known that the character sizes in the input data are substantially uniform.

The character height calculating section 71 calculates an average character height with respect to the circumscribed rectangle. The character contact eliminating section 72 eliminates, as the contact character group, the circumscribed rectangles that are not less than a-predetermined-value-times as large as a size of the average character height. Then, the processes after step 404 inclusive are effected on the circumscribed rectangles exclusive of the contact character group. With this processing, even when the characters contact each other between the upper and lower character strings, the character string is accurately extracted.

Figure 28:
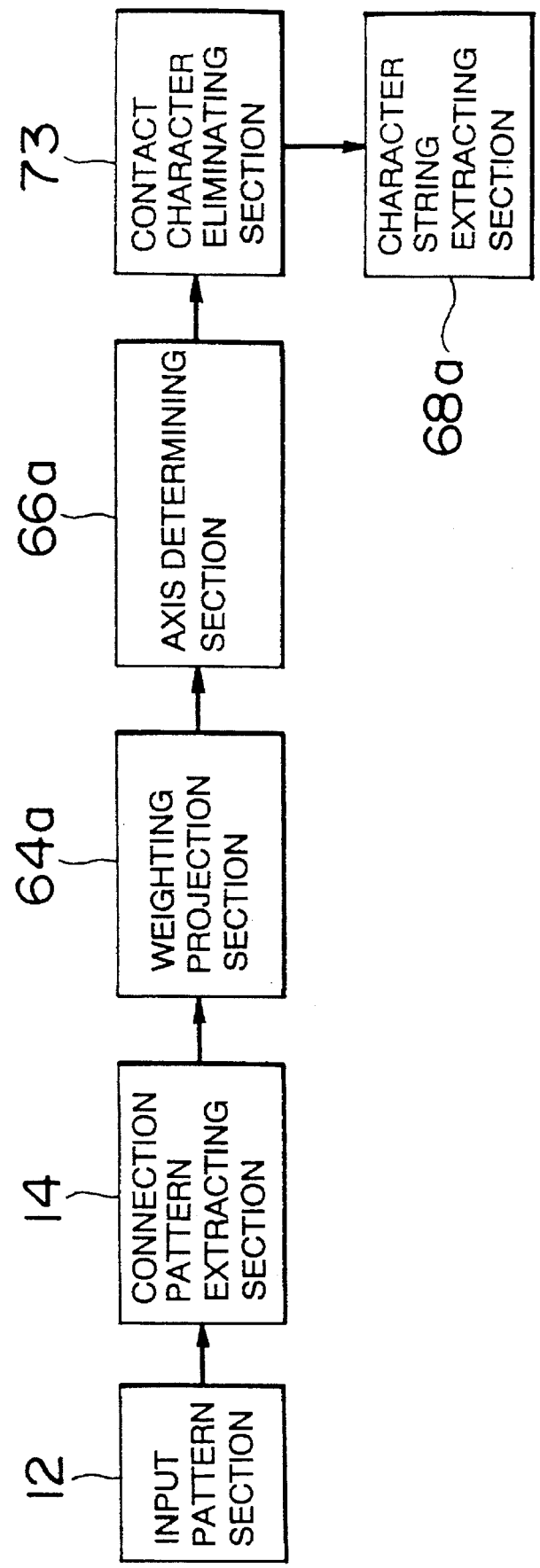
FIG. 28 is a block diagram illustrating a construction of the character string extracting apparatus in accordance with a third embodiment of this invention.

Next, a third embodiment of the character string extracting apparatus will be discussed. FIG. 28 is a block diagram showing a construction of the character string extracting apparatus in accordance with the third embodiment of this invention. A weighting projection section 64a is connected to the connection pattern extracting section 14. The weighting projection section 64a sets, as peaks, upper and lower ends of a lengthwise or crosswise line segment of the circumscribed rectangle of the pattern. The weighting projection section 64a then effects the weighting projection in accordance with a distance from the upper end thereof and a distance from the lower end. An axis determining section 66a is connected to the weighting projection section 64a.

The axis determining section 66a determines a central axis of the character string from a peak value of the upper end of the projection histogram and a peak value of the lower end thereof. A character contact eliminating section 73 is connected to the axis determining section 66a. The character contact eliminating section 73 eliminates, as a contact character string group, the circumscribed rectangles that a plurality of character string axes traverse. A character string extracting section 68a is connected to the character contact eliminating section 73.

The character string extracting section 68a extracts the character string belonging to the pattern on the basis of the above central axis and a distance from the center of each circumscribed rectangle of the circumscribed rectangles exclusive of the contact character string group. Note that the same sections as those in the second embodiment are marked with the like symbols in the third embodiment.

Figure 29:
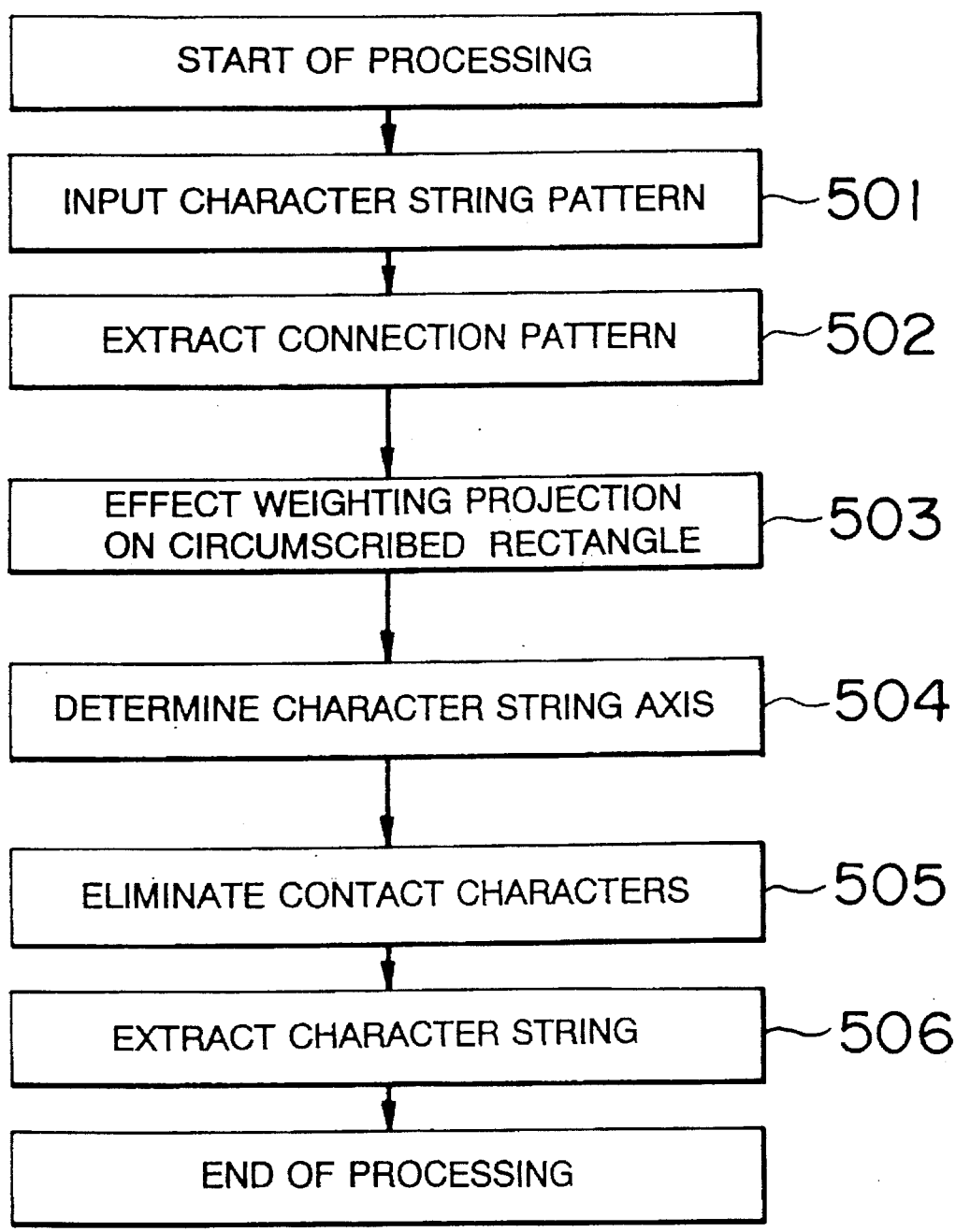
FIG. 29 is a flowchart showing a character string extracting method in accordance with the third embodiment of this invention.

Next, the processes in the third embodiment will be explained. FIG. 29 is a flowchart showing the character string extracting method in accordance with the embodiment 3 of this invention.

First, the connection pattern extracting section 14 inputs each character string pattern from the input pattern section 12 (step 501). The connection pattern extracting section 14 extracts the segment pattern by labeling and, at the same time, obtains the circumscribed rectangle of each pattern (step 502).

Figure 30:
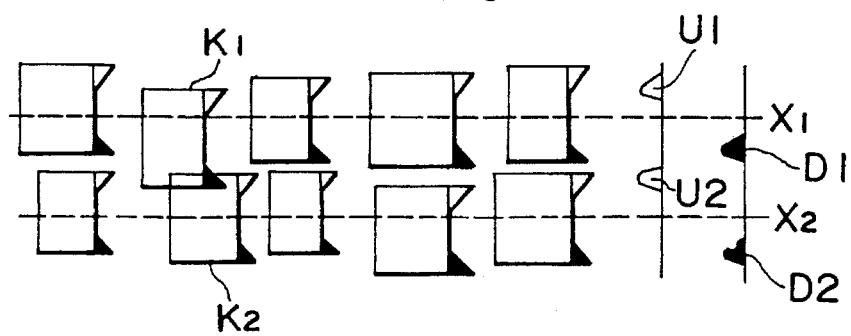
FIG. 30 is a diagram showing a weighting projection in the third embodiment.

The weighting projection section 64a, as illustrated in FIG. 30, performs the weighting projection in accordance with the distance from the upper end and the distance from the lower end, wherein the peaks are the upper and lower ends of the lengthwise or crosswise line segment of the circumscribed rectangle of the pattern (step 503). Based on this method, the weighting projection is implemented so that the value decreases toward the center of height of the circumscribed rectangle from the upper or lower end. With this weighting projection, as shown in FIG. 30, there are obtained projections U1 and U2 of the upper end and projections D1 and D2 of the lower end.

Then, the axis determining section 66a obtains the peak value of the upper end of the projection histogram and the peak value of the lower end per character string, thereby determining the centers of these peak values at the central axes $X_1$ and $X_2$ of the character string (step 504).

Next, the contact character eliminating section 73 eliminates the circumscribed rectangles that the plurality of character string axes traverse among the respective circumscribed rectangles as those in which the characters contact each other at the upper and lower portions (step 505). The circumscribed rectangles eliminated herein are circumscribed rectangles $K_1$ and $K_2$ shown in FIG. 30. Then, the character string extracting section 68a calculates distances between the respective circumscribed rectangles and the character string axes with respect to the remaining circumscribed rectangles. The character string extracting section 68a extracts the character string by making the circumscribed rectangle belong to the character string axis exhibiting the minimum distance (step 506).

Figure 31:
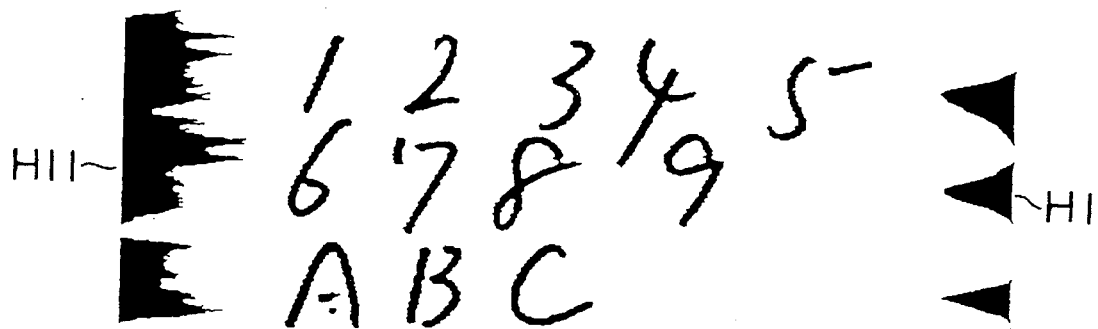
FIG. 31 is a diagram showing results of projections on black pixels according to the method in the second embodiment and a conventional method.
Figure 32:
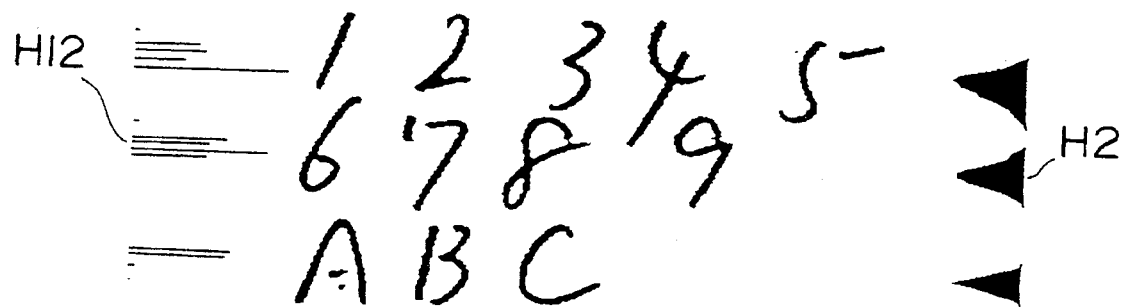
FIG. 32 is a diagram showing results of the weighting projection on the center of the circumscribed rectangle according to the method in the second embodiment and the conventional method.

FIG. 31 shows results of the projections of black pixels according to the method in accordance with the second embodiment and the conventional method. FIG. 32 shows results of the weighting projections on the centers of the rectangles according to the method in accordance with the second embodiment and the conventional method. Referring to FIG. 31, a histogram H1 at the right end of the character string is a result of processing in the second embodiment. A histogram H11 at the left end shows a result of processing based on the conventional method. Turning to FIG. 32, a histogram H2 at the right end of the character string is a result of processing in the second embodiment. A histogram H12 at the left end shows a result of processing based on the conventional method.

Figure 33:
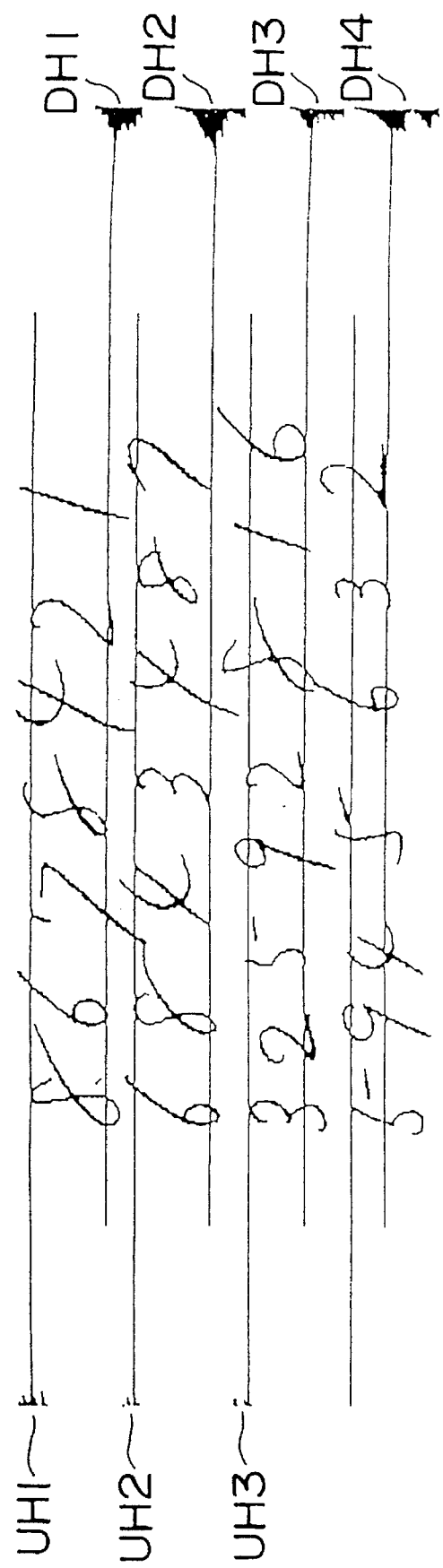
FIG. 33 is a diagram showing a result of extracting the character string when the characters contact each other between upper and lower character strings.

FIG. 33 shows a result of extracting the character string when the characters contact each other between the upper and lower character strings. Histograms UH1–UH3 at the left end show results of the upper end projections. Histograms DH1–DH4 at the right end show results of lower end projections. Then, peaks of the respective projection histograms are shown. The character string axis centers on this peak.

The character strings are disposed close to each other, and, even if a part of a certain character belongs to other character string, the character string extracting apparatuses in the second and third embodiments perform the weighting projection corresponding to the height position with respect to the lengthwise or crosswise line segment of the circumscribed rectangle of the pattern. The character string is thereby extracted at the high speed with the high accuracy. Note that the constructions of the second and third embodiments may be combined.

Next, a fourth embodiment of the character string extracting apparatus will be explained. FIG. 34 is a block diagram illustrating a construction of the character string extracting apparatus in accordance with the fourth embodiment of this invention. The embodiment 4 is applied to an on-line handwritten character string. A difference in terms of construction between the third and fourth embodiments is a weighting projection section 64b. Other configurations are the same as those in the third embodiment.

The weighting projection section 64b effects such a weighting projection that the weighting value attenuates toward the left end of the circumscribed rectangle from the right end thereof. The weighting projection section 64b also effects such a weighting projection that the weighting value attenuates toward the right end from the left end. The weighting projection section 64b obtains each peak of a projection histogram acquired. The weighting projection section 64b estimates a one-character central potion and a one-character existing area from the respective peak values.

Figures 35A, 35B, 35C:
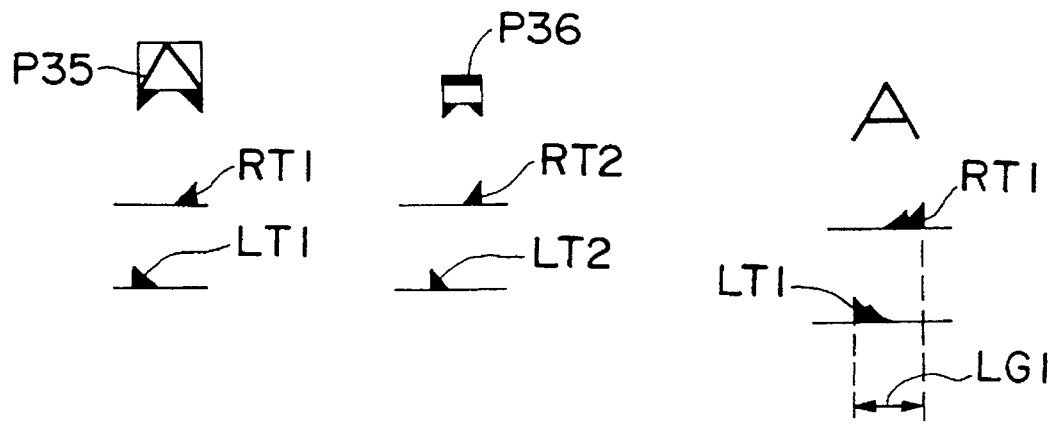
FIG. 35A is a diagram showing right- and left-end projections with respect to an outer pattern of "A"
FIG. 35B is a diagram showing the right- and left-end projections with respect to an inner pattern of "A"
FIG. 35C is a diagram showing an example of a one-character existing area when writing an on-line handwritten letter "A"

Explained is a case where, e.g., a letter "A" among the on-line handwritten characters is written. First, as shown in FIG. 35A, a right-end projection RT1 and a left-end projection LT1 are conducted with respect to an outer pattern P35 at a first stroke. Next, as shown in FIG. 35B, at a second stroke, a right-end projection RT2 and a left-end projection LT2 are performed with respect to an inner pattern P36. Then, as illustrated in FIG. 35C, the projections at the respective ends are synthesized, thereby obtaining a one-character existing range LG1.

Figure 36A:
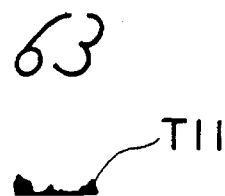
FIG. 36A is a diagram showing a simple projection with respect to the character string having an overhang.

On the other hand, in a certain character string, as shown in, e.g., FIG. 36A, it is assumed that "63" has an overhang. In this case, if a simple projection takes place, a clear trough is not produced in a projection histogram T11.

Figure 36B:
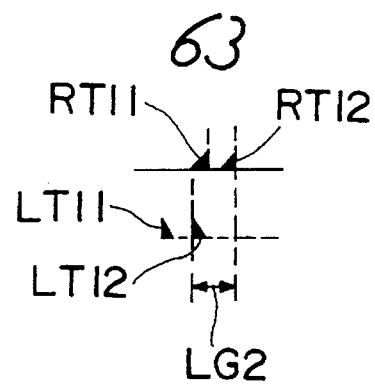
FIG. 36B is a diagram showing an example of the one-character existing area when performing right- and left-end projections with respect to the character string having the overhang.

Then, the weighting projection section 64b, as depicted in FIG. 36B, may effect right-end projections RT11, RT12 and left-end projections LT11, LT12 with respect to each of two characters "63". A one-character existing area LG2 is thereby obtained.

According to the above-mentioned, the clear trough is produced in the projection histogram, and it is possible to easily accurately determine the right and left ends and the central position of each character.

It is apparent that, in this invention, a wide range of different working modes can be formed based on the invention without deviating from the spirit and scope of the invention. This invention is not restricted by its specific working modes except being limited by the appended claims.

What is claimed is:

1. A character segmenting apparatus segmenting a character based on connection data imparted to each segment pattern, and in which a character string pattern is formed by arranging a plurality of character segment patterns, each segment pattern comprising one of a pattern formed by one character and a small segment pattern formed by a part of one character, said character segmenting apparatus comprising:

extracting means for extracting the character segment pattern on the basis of the connection data;

character size calculating means for calculating a first histogram of one of a lengthwise character size and a crosswise character size of rectangles circumscribing the character segment pattern extracted by said extracting means and, concurrently, calculating an average character size and a first variance value of the average character size based on the first histogram;

character pitch calculating means for calculating a second histogram of a pitch between the rectangles in said character size calculating means and, concurrently, calculating an average character pitch and a second variance value based on the second histogram;

integrating means for integrating together the character segment patterns forming the one character while changing character integrating conditions in accordance with the average character size and the first variance value and the average character pitch and the second variance value; and segment integrating means for integrating the small segment pattern by distinguishing the small segment pattern in the character segment pattern based on the average character size obtained by said character size calculating means.

2. The character segmenting apparatus according to claim 1, further comprising stroke extracting means for extracting a small separation stroke by which a pattern being integrated to one character is separated in the small segment pattern from within the segment pattern in the character string pattern based on a result of obtaining one of an area ratio and a height ratio of the average character size to the character size of the rectangle by use of the average character size calculated by said character size calculating means.

3. The character segmenting apparatus according to claim 2, wherein said integrating means changes character integrating conditions in accordance with a value of an evaluation function comprising the average character size, the size variance value, the average character pitch and the pitch variance value when integrating the characters containing the small separation stroke.

4. The character segmenting apparatus according to claim 3, wherein said integrating means comprises certainty factor integrating means for calculating distances between the small separation stroke and patterns located on the right and left sides thereof and for performing an integration based on a distance ratio therebetween when a pitch width is less than or equal to a certain threshold value, and when a value of the evaluation function falls within a certain range.

5. A character segmenting apparatus segmenting a character based on connection data imparted to each segment pattern, and in which a character string pattern is formed by arranging a plurality of character segment patterns, each segment pattern comprising one of a pattern formed by one character and a small segment pattern formed by a part of one character, said character segmenting apparatus comprising:

extracting means for extracting the character segment pattern on the basis of the connection data;

character size calculating means for calculating a first histogram of one of a lengthwise character size and a crosswise character size of rectangles circumscribing the character segment pattern extracted by said extracting means and, concurrently, calculating an average character size and a first variance value of the average character size based on the first histogram;

character pitch calculating means for calculating a second histogram of a pitch between the rectangles in said character size calculating means and, concurrently, calculating an average character pitch and a second variance value based on the second histogram, wherein said character size calculating means comprises:

size histogram means for calculating the first histograms of one of the lengthwise character size and the crosswise character size of the rectangle circumscribing the character segment pattern in the character string pattern, first average size means for calculating a tentative average character size based on the first histograms in the character string calculated by said size histogram means, size area determining means for determining a character size calculating area based on the tentative average character size calculated by said first average size means, and second average size means for calculating an average character size in the character size area determined by said size area determining means;

integrating means for integrating together the character segment patterns forming the one character while changing character integrating conditions in accordance with the average character size and the first variance value and the average character pitch and the second variance value; and segment integrating means for integrating the small segment pattern by distinguishing the small segment pattern in the character segment pattern based on the average character size obtained by said character size calculating means.

6. A character segmenting apparatus segmenting a character based on connection data imparted to each segment pattern, and in which a character string pattern is formed by arranging a plurality of character segment patterns, each segment pattern comprising one of a pattern formed by one character and a small segment pattern formed by a part of one character, said character segmenting apparatus comprising:

extracting means for extracting the character segment pattern on the basis of the connection data;

character size calculating means for calculating a first histogram of one of a lengthwise character size and a crosswise character size of rectangles circumscribing the character segment pattern extracted by said extracting means and, concurrently, calculating an average character size and a first variance value of the average character size based on the first histogram;

character pitch calculating means for calculating a second histogram of a pitch between the rectangles in said character size calculating means and, concurrently, calculating an average character pitch and a second variance value based on the second histogram, wherein said character pitch calculating means comprises:

pitch histogram means for calculating, as a pitch, a distance between the rectangles with respect to the segment pattern other than the small separation stroke in calculating a pitch between the characters and, concurrently, calculating a histogram of the pitch, first average pitch means for calculating a tentative average character pitch based on the histogram obtained by said pitch histogram means, pitch area determining means for determining a character calculating area based on the tentative average character pitch obtained by said first average pitch means, and second average pitch means for calculating an average character pitch in the character pitch area determined by said pitch area determining means;

integrating means for integrating together the character segment patterns forming the one character while changing character integrating conditions in accordance with the average character size and the first variance value and the average character pitch and the second variance value;

segment integrating means for integrating the small segment pattern by distinguishing the small segment pattern in the character segment pattern based on the average character size obtained by said character size calculating means; and stroke extracting means for extracting a small separation stroke by which a pattern being integrated to one character is separated in the small segment pattern from within the segment pattern in the character string pattern based on a result of obtaining one of an area ratio and a height ratio of the average character size to the character size of the rectangle by use of the average character size calculated by said character size calculating means.

7. A character segmenting apparatus segmenting a character based on connection data imparted to each segment pattern, and in which a character string pattern is formed by arranging a plurality of character segment patterns, each segment pattern comprising one of a pattern formed by one character and a small segment pattern formed by a part of one character, said character segmenting apparatus comprising:

extracting means for extracting the character segment pattern on the basis of the connection data;

character size calculating means for calculating a first histogram of one of a lengthwise character size and a crosswise character size of rectangles circumscribing the character segment pattern extracted by said extracting means and, concurrently, calculating an average character size and a first variance value of the average character size based on the first histogram;

character pitch calculating means for calculating a second histogram of a pitch between the rectangles in said character size calculating means and, concurrently, calculating an average character pitch and a second variance value based on the second histogram;

integrating means for integrating together the character segment patterns forming the one character while changing character integrating conditions in accordance with the average character size and the first variance value and the average character pitch and the second variance value;

segment integrating means for integrating the small segment pattern by distinguishing the small segment pattern in the character segment pattern based on the average character size obtained by said character size calculating means; and stroke extracting means for extracting a small separation stroke by which a pattern being integrated to one character is separated in the small segment pattern from within the segment pattern in the character string pattern based on a result of obtaining one of an area ratio and a height ratio of the average character size to the character size of the rectangle by use of the average character size calculated by said character size calculating means, wherein said segment integrating means comprises:

line density means for calculating line densities with respect to the small separation stroke, the segment patterns located on the right and left sides thereof and also, in integrating them, a segment pattern;

inclination calculating means for calculating an inclination of the small separation stroke; and distinguishing means for distinguishing which one of the segment patterns located on the right and left sides the small separation stroke should be integrated with based on the line densities obtained by said line density means and the inclination of the small separation stroke obtained by said inclination calculating means.

8. The character segmenting apparatus according to claim 7, wherein said line density means equally divides the rectangle of the segment pattern at equal intervals to 10 pieces in calculating the line density and takes a maximum value of the line densities counted from the 2nd line to the 8th line in the lines of the 10 pieces divided at the equal intervals.

9. The character segmenting apparatus according to claim 7, wherein said line density means calculates the line density of the segment pattern in a given one direction and next, when turned in other direction, calculates the line density, thus obtaining a total of the line densities in multi-directions.

10. The character segmenting apparatus according to claim 7, said inclination calculating means divides the segment pattern at equal intervals in a longer-size direction with respect to the lengthwise size and the crosswise size of the rectangle and calculates an inclination based on intersections between the segment pattern and respective line divided at the equal intervals.

11. The apparatus for segmenting a character according to claim 7, wherein said stroke extracting means extracts the small separation stroke and a pattern formed by a small written single character, said line density calculating means calculates the small separation stroke and the pattern formed by the small written single character, determines as the small separation stroke, if calculated line densities are smaller than a predetermined value, and determines as the pattern formed by the small written single character, if calculated line densities are larger than predetermined value, said inclination calculating means calculates the inclination of the small separation stroke.

12. The apparatus for segmenting a character according to claim 11, wherein said distinguishing means integrates the small separation stroke into one of the segment patterns located on the right and left sides on the basis of an inclination of the small separation stroke calculated by said inclination calculating means and distances between the segment patterns located on the right and left sides of the small separation stroke.

13. A character string extracting apparatus extracting a character string based on connection data imparted to each segment pattern, and in which a character string pattern is formed by arranging a plurality of character segment patterns, said apparatus comprising:

extracting means for extracting the character segment pattern based on the connection data;

weighting projection means for obtaining a projection histogram by performing a weighting projection on one of a lengthwise line segment and a crosswise line segment of a rectangle circumscribing the segment pattern extracted by said extracting means;

axis determining means for determining a character string axis based on the projection histogram obtained by said weighting projection means;

character string extracting means for extracting a character string based on the character string axis determined by said axis determining means;

rectangle integrating means for integrating, if the respective rectangles are overlapped with each other, overlapped rectangles;

calculating means for calculating an average character size with respect to a result of integration by said rectangle integrating means; and eliminating means for eliminating, as a group of contact characters between upper-lower character strings, one of the rectangles that is not less than a predetermined-value-times as large as the average character size obtained by said calculating means and rectangles which spread over a plurality of character strings.

14. The character string extracting apparatus according to claim 13, further comprising:

calculating means for calculating an average character height with respect to the rectangle; and eliminating means for eliminating, as a group of contact characters, the rectangles that are not less than a-predetermined-value-times as large as a size of the average character height obtained by said calculating means.

15. The character string extracting apparatus according to claim 13, further comprising:

eliminating means for eliminating, as a group of contact characters, the rectangles that a plurality of character string axes traverse, wherein said weighting projection means sets, as peaks, the upper and lower ends of one of the lengthwise line segment and crosswise line segment of the rectangle of the segment pattern and obtains the projection histogram by effecting the weighting projection in accordance with a distance from the upper end and a distance from the lower end, said axis determining means determining a central axis of the character string from a peak value of the upper end and a peak value of the lower end of the projection histogram obtained by said weighting projection means, and said character string extracting means extracts the character string to which the pattern belongs on the basis of a distance between the central axis and the center of each rectangle of the rectangles exclusive of the group of contact characters extracted by said eliminating means.

16. The character string extracting apparatus according to claim 13, wherein said weighting projection means effects the weighting projection on the upper and lower ends of the circumscribed rectangle of the segment pattern, said axis determining means determines a candidate position of the upper end and a candidate position of the lower end of the projection histogram obtained by said weighting projection means and also determines a central axis of the character string from the upper end candidate position and the lower end candidate position, and said character string extracting means extracts the character string to which the pattern belongs on the basis of a distance between the central axis and the center of each circumscribed rectangle.

17. The character string extracting apparatus according to claim 13, wherein said weighting projection means obtains each projection of a first projection histogram by performing a first weighting projection such that a weighting value attenuates from one end of the rectangle toward the other end and a second projection histogram by performing a second weighting projection such that the weighting value attenuates from the other end toward one end and thus obtains each peak value of the first projection histogram and the second projection histogram and thus estimates a one-character central position and a one-character existing area from the respective peak values.

18. A character segmenting method of segmenting a character based on connection data imparted to each segment pattern, and in which a character string pattern is formed by arranging a plurality of character segment patterns, and each segment pattern comprises one of a pattern formed by one character and a small segment pattern formed by a part of one character, said method comprising the steps of:

an extracting step of extracting the character segment pattern on the basis of the connection data;

a character size calculating step of calculating a first histogram of one of a lengthwise character size and a crosswise character size of a rectangle circumscribing the extracted character segment pattern and, concurrently, calculating an average character size and a first variance value based on the first histogram;

a character pitch calculating step of calculating second histogram of a pitch between the rectangles and, concurrently, calculating an average character pitch and a second variance value based on the second histogram;

an integrating step of integrating together the character segment patterns forming the character while changing character integrating conditions in accordance with the average character size, the first value, the average character pitch and the second variance value; and a segment integrating step of integrating the small segment pattern by distinguishing the small segment pattern in the character segment pattern based on the average character size.

19. The character segmenting method according to claim 18, further comprising a stroke extracting step of extracting a small separation stroke which a pattern being integrated to one character is separated in the small segment pattern from within the segment pattern in the character string pattern on the basis of a result of obtaining an area ratio or a height ratio of the average character size to the character size of the rectangle by use of the average character size.

20. The character segmenting method according to claim 19, wherein said integrating step comprises changing character integrating conditions in accordance with a value of an evaluation function comprising the average character size, the size variance value, the average character pitch and the pitch variance value when integrating the characters containing the small separation stroke.

21. The character segmenting method according to claim 20, wherein said integrating step includes a certainty factor integrating step of calculating distances between the extracted small separation stroke and patterns located on the right and left sides thereof and performing an integration on the basis of a distance ratio therebetween when a pitch width is less than or equal to a certain threshold value, and when the value of the evaluation function falls within a certain range.

22. A character segmenting method of segmenting a character based on connection data imparted to each segment pattern, and in which a character string pattern is formed by arranging a plurality of character segment patterns, and each segment pattern comprises one of a pattern formed by one character and a small segment pattern formed by a part of one character, said method comprising the steps of:

an extracting step of extracting the character segment pattern on the basis of the connection data;

a character size calculating step of calculating a first histogram of one of a lengthwise character size and a crosswise character size of a rectangle circumscribing the extracted character segment pattern and, concurrently, calculating an average character size and a first variance value based on the first histogram, wherein said character size calculating step comprises:
   a size histogram step of calculating the first histogram of one of the lengthwise character size and the crosswise character size of the rectangle,
   a first average size step of calculating a tentative average character size based on the calculated histograms in the character string,
   a size area determining step of determining a character size calculating area based on the calculated tentative average character size, and
   a second average size step of calculating an average character size in the determined character size area;

a character pitch calculating step of calculating second histogram of a pitch between the rectangles and, concurrently, calculating an average character pitch and a second variance value based on the second histogram;

an integrating step of integrating together the character segment patterns forming the character while changing character integrating conditions in accordance with the average character size, the first value, the average character pitch and the second variance value; and a segment integrating step of integrating the small segment pattern by distinguishing the small segment pattern in the character segment pattern based on the average character size.

23. A character segmenting method of segmenting a character based on connection data imparted to each segment pattern, and in which a character string pattern is formed by arranging a plurality of character segment patterns, and each segment pattern comprises one of a pattern formed by one character and a small segment pattern formed by a part of one character, said method comprising the steps of:

an extracting step of extracting the character segment pattern on the basis of the connection data;

a character size calculating step of calculating a first histogram of one of a lengthwise character size and a crosswise character size of a rectangle circumscribing the extracted character segment pattern and, concurrently, calculating an average character size and a first variance value based on the first histogram;

a character pitch calculating. Step of calculating second histogram of a pitch between the rectangles and, concurrently, calculating an average character pitch and a second variance value based on the second histogram;

an integrating step of integrating together the character segment patterns forming the character while changing character integrating conditions in accordance with the average character size, the first value, the average character pitch and the second variance value;

a segment integrating step of integrating the small segment pattern by distinguishing the small segment pattern in the character segment pattern based on the average character size; and a stroke extracting step of extracting a small separation stroke which a pattern being integrated to one character is separated in the small segment pattern from within the segment pattern in the character string pattern on the basis of a result of obtaining an area ratio or a height ratio of the average character size to the character size of the rectangle by use of the average character size, wherein said character pitch calculating step comprises:
   a pitch histogram step of calculating, as a pitch, a distance between the rectangles with respect to the segment pattern other than the small separation stroke when calculating a pitch between the characters and, calculating a histogram of the pitch,
   a first average pitch step of calculating a tentative average character pitch on the basis of the histogram of the pitch,
   a pitch area determining step of determining a character calculating area on the basis of the tentative average character pitch, and
   a second average pitch step of calculating an average character pitch in the determined character pitch area.

24. A character segmenting method segmenting a character based on connection data imparted to each segment pattern, and in which a character string pattern is formed by arranging a plurality of character segment patterns, and each segment pattern comprises one of a pattern formed by one character and a small segment pattern formed by a part of one character, said method comprising the steps of:

an extracting step of extracting the character segment pattern on the basis of the connection data;

a character size calculating step of calculating a first histogram of one of a lengthwise character size and a crosswise character size of a rectangle circumscribing the extracted character segment pattern and, concurrently, calculating an average character size and a first variance value based on the first histogram;

a character pitch calculating step of calculating second histogram of a pitch between the rectangles and, concurrently, calculating an average character pitch and a second variance value based on the second histogram;

an integrating step of integrating together the character segment patterns forming the character while changing character integrating conditions in accordance with the average character size, the first value, the average character pitch and the second variance value;

a segment integrating step of integrating the small segment pattern by distinguishing the small segment pattern in the character segment pattern based on the average character size; and a stroke extracting step of extracting a small separation stroke which a pattern being integrated to one character is separated in the small segment pattern from within the segment pattern in the character string pattern on the basis of a result of obtaining an area ratio or a height ratio of the average character size to the character size of the rectangle by use of the average character size, wherein said segment integrating step comprises:
   a line density step of calculating line densities with respect to the extracted small separation stroke, the segment patterns located on the right and left sides thereof and also, in integrating them, a segment pattern;

an inclination calculating step of calculating an inclination of the small separation stroke; and a distinguishing step of distinguishing which one of the segment patterns located on the right and left sides the small separation stroke should be integrated with on the basis of the line densities and an inclination of the small separation stroke.

25. The character segmenting method according to claim 24, wherein said line density step comprises equally dividing the rectangle of the segment pattern into equal intervals to 10 pieces in calculating the line density and taking a maximum value of the line densities counted from the 2nd line to the 8th line in the lines of the 10 pieces divided at the equal intervals.

26. The character segmenting method according to claim 24, wherein said inclination calculating step comprises dividing the segment pattern at equal intervals in a longer-size direction with respect to the lengthwise size and the crosswise size of the rectangle and calculating an inclination on the basis of intersections between the segment pattern and respective line divided at the equal intervals.

27. The character segmenting method according to claim 24, wherein said inclination calculating step comprises dividing the segment pattern at equal intervals in a longer-size direction with respect to the lengthwise size and the crosswise size of the rectangle and calculating an inclination on the basis of intersections between the segment pattern and respective line divided at the equal intervals.

28. A character string extracting method of extracting a character string based on connection data imparted to each segment pattern, and in which a character string pattern is formed by arranging a plurality of character segment patterns, said method comprising the steps of:

an extracting step of extracting the character segment pattern based on the connection data;

a weighting projection step of obtaining a projection histogram by performing a weighting projection on one of a lengthwise line segment and a crosswise line segment of a rectangle circumscribing the extracted segment pattern;

an axis determining step of determining a character string axis based on the projection histogram;

a character string extracting step of extracting a character string based on the character string axis determined in said axis determining step;

a rectangle integrating step of integrating, if the respective rectangles are overlapped with each other, overlapped rectangles;

a calculating step of calculating an average character size with respect to a result of integration by said rectangle integrating step; and an eliminating step of eliminating, as a group of contact characters between upper-lower character strings, one of the rectangles that is not less than a predetermined-value-times as large as the average character size obtained by said calculating step and rectangles which spread over a plurality of character strings.

29. The character string extracting method according to claim 28, wherein said weighting projection step comprises effecting the weighting projection in accordance with a distance from a center of the line segment by centering a peak on one of the lengthwise line segment and the crosswise line segment of the rectangle of the segment pattern, said axis determining step comprises extracting a character string to which the pattern belongs based on the central axis and a distance from the center of each rectangle.

30. The character string extracting method according to claim 28, further comprising:

a calculating step of calculating an average character height with respect to the rectangle; and an eliminating step of eliminating, as a group of contact characters, the rectangles that are not less than a-predetermined-value-times as large as a size of the average character height.

31. The character string extracting method according to claim 28, further comprising:

an eliminating step of eliminating, as a group of contact characters, the rectangles that a plurality of character string axes traverse, wherein said weighting projection step comprises setting, as peaks, the upper and lower ends of one of the lengthwise line segments and the crosswise line segment of the rectangle of the segment pattern and effecting the weighting projection in accordance with a distance from the upper end and a distance from the lower end, said axis determining step comprises determining a central axis of the character string from a peak value of the upper end and a peak value of the lower end of the projection histogram, and said character string extracting step comprises extracting the character string to which the pattern belongs based on a distance between the central axis and the center of each rectangle of the rectangles exclusive of the group of contact characters extracted by said eliminating step.

32. The character string extracting method according to claim 28, wherein said weighting projection step comprises effecting the weighting projection on the upper and lower ends of the rectangle of the segment pattern, said axis determining step comprises determining a candidate position of the upper end and a candidate position of the lower end of the projection histogram and also determining a central axis of the character string from the upper end candidate position and the lower end candidate position, and said character string extracting step comprises extracting the character string to which the pattern belongs based on a distance between the central axis and the center of each rectangle.

33. The character string extracting method according to claim 28, wherein said weighting projection step comprises obtaining each peak of the projection histogram by performing such a weighting projection that a weighting value attenuates from one end of the rectangle toward the other end and such a weighting projection that the weighting value attenuates from the other end toward one end and thus estimating a one-character central position and a one-character existing area from the respective peak values.

* * * * *